（12） United States Patent
Ueki et al.

(10) Patent No.: US 10,437,028 B2
(45) Date of Patent: Oct. 8, 2019

(54) LENS DEVICE, CAMERA SYSTEM, AND ABERRATION CORRECTION UNIT

(71) Applicant: FUJIFILM Corporation, Tokyo (JP)

(72) Inventors: Nobuaki Ueki, Saitama (JP); Tsuyoshi Mitarai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 15/920,459

(22) Filed: Mar. 14, 2018

(65) Prior Publication Data

US 2018/0203213 A1 Jul. 19, 2018

Related U.S. Application Data

(63) Continuation of application No. PCT/JP2016/071591, filed on Jul. 22, 2016.

(30) Foreign Application Priority Data

Sep. 17, 2015 (JP) .................................. 2015-183886

(51) Int. Cl.
*G02B 13/18* (2006.01)
*G02B 7/02* (2006.01)
(Continued)

(52) U.S. Cl.
CPC ............... *G02B 13/18* (2013.01); *G02B 7/02* (2013.01); *G02B 7/021* (2013.01); *G02B 13/00* (2013.01);
(Continued)

(58) Field of Classification Search
CPC ..................................................... G02B 13/18
(Continued)

(56) References Cited

U.S. PATENT DOCUMENTS

| 2003/0128333 | A1* | 7/2003 | Fukuma ............... A61B 3/13 351/205 |
| 2015/0248050 | A1 | 9/2015 | Nakamura |
| 2015/0355437 | A1 | 12/2015 | Kikuchi |

FOREIGN PATENT DOCUMENTS

| JP | H06267820 | 9/1994 |
| JP | 2003172876 | 6/2003 |
| JP | 2014170043 | 9/2014 |

OTHER PUBLICATIONS

"International Search Report (Form PCT/ISA/210) of PCT/JP2016/071591," dated Oct. 25, 2016, with English translation thereof, pp. 1-5.

(Continued)

*Primary Examiner* — James C. Jones
(74) *Attorney, Agent, or Firm* — JCIPRNET

(57) ABSTRACT

The first and second optical elements are held so as to be rotatable relative to each other about an optical axis. An aberration, which can cancel an aberration caused by a color separation prism, is generated from a synthesis of aberrations generated by the first and second optical elements in a case in which the second optical element is positioned at a first position with respect to the first optical element. The aberration generated by the first optical element is cancelled by the aberration generated by the second optical element in a case in which the second optical element is positioned at a second position with respect to the first optical element. The second optical element is positioned at the first position in a case in which the lens device is to be used in a 3-CCD type first camera device, and the second optical element is positioned at the second position with respect to the first optical element in a case in which the lens device is to be used in a single-CCD type second camera device.

9 Claims, 24 Drawing Sheets

(51) Int. Cl.
*G02B 13/00* (2006.01)
*G03B 17/14* (2006.01)
*H04N 5/225* (2006.01)
*H04N 9/097* (2006.01)
*H04N 5/217* (2011.01)
*G03B 17/56* (2006.01)
*G02B 15/20* (2006.01)
*H04N 9/04* (2006.01)

(52) U.S. Cl.
CPC ........... *G03B 17/14* (2013.01); *G03B 17/565* (2013.01); *H04N 5/217* (2013.01); *H04N 5/2254* (2013.01); *H04N 9/097* (2013.01); *G02B 15/20* (2013.01); *H04N 9/045* (2013.01)

(58) Field of Classification Search
USPC ........................................................ 359/710
See application file for complete search history.

(56) References Cited

OTHER PUBLICATIONS

"Written Opinion of the International Searching Authority (Form PCT/ISA/237) of PCT/JP2016/071591," dated Oct. 25, 2016, with English translation thereof, pp. 1-10.

\* cited by examiner

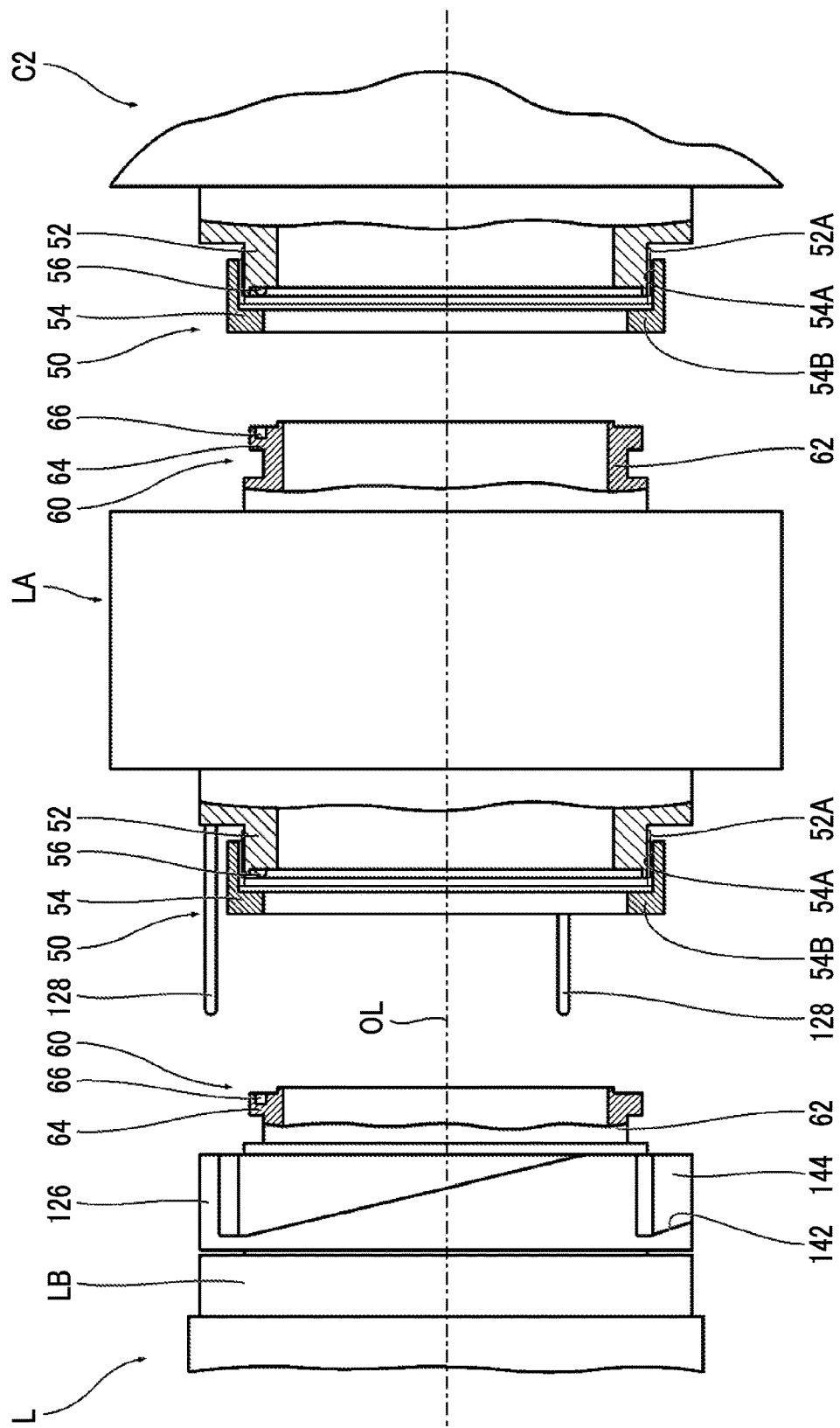

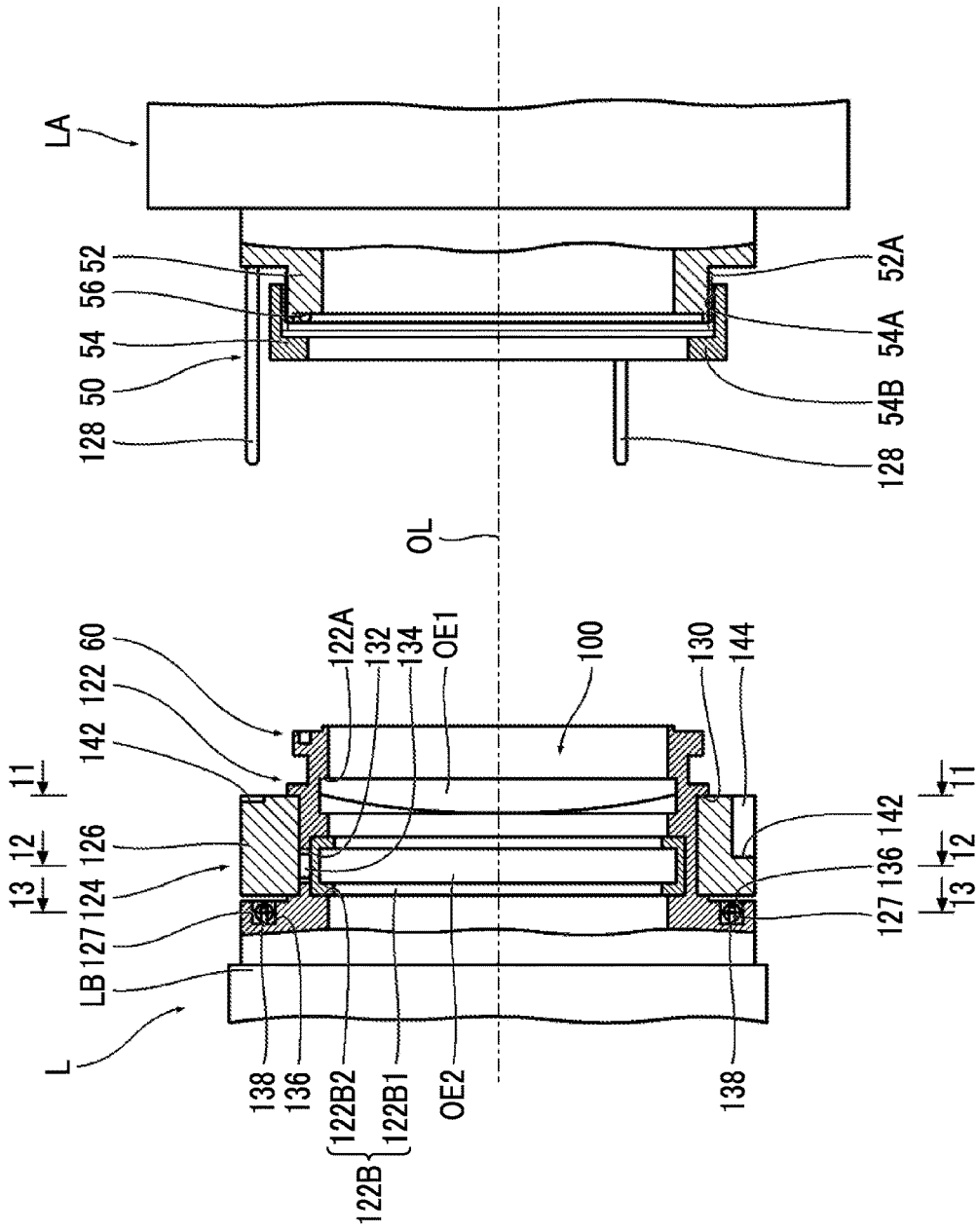

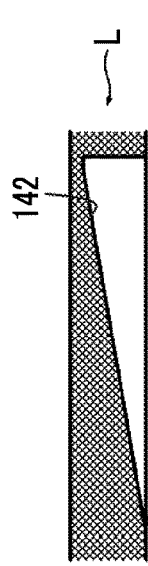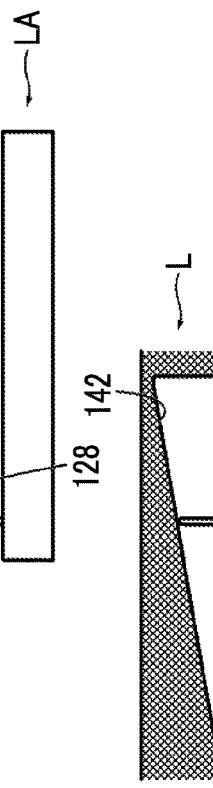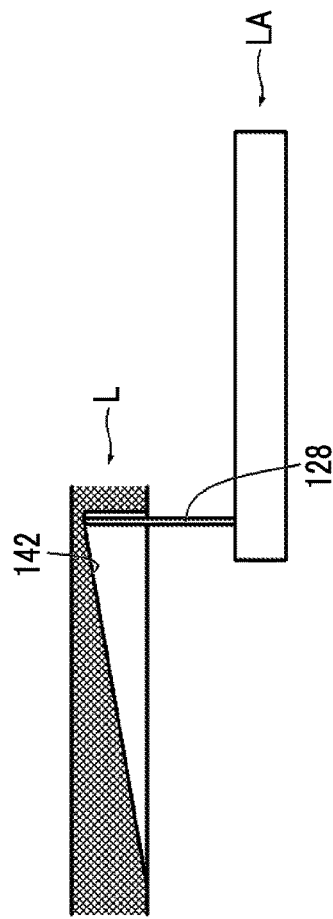
FIG. 16A
FIG. 16B
FIG. 16C

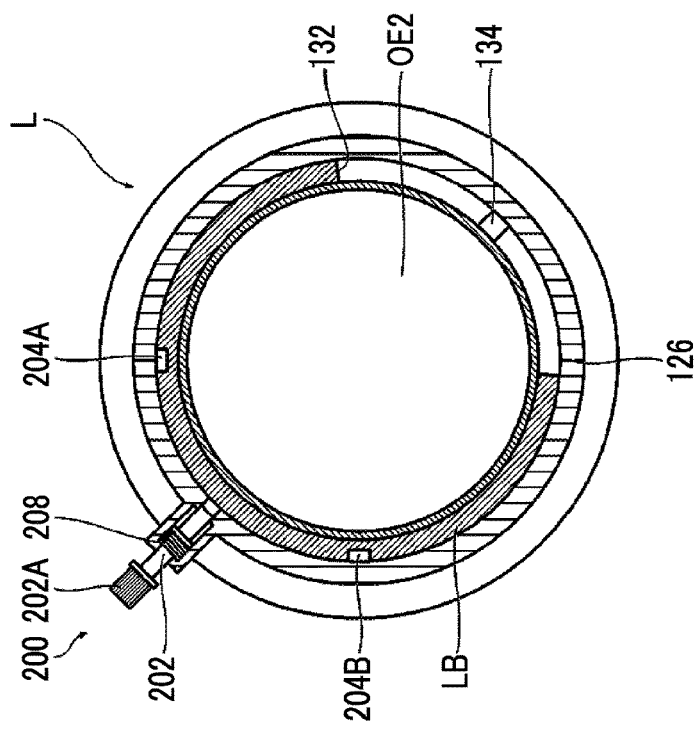
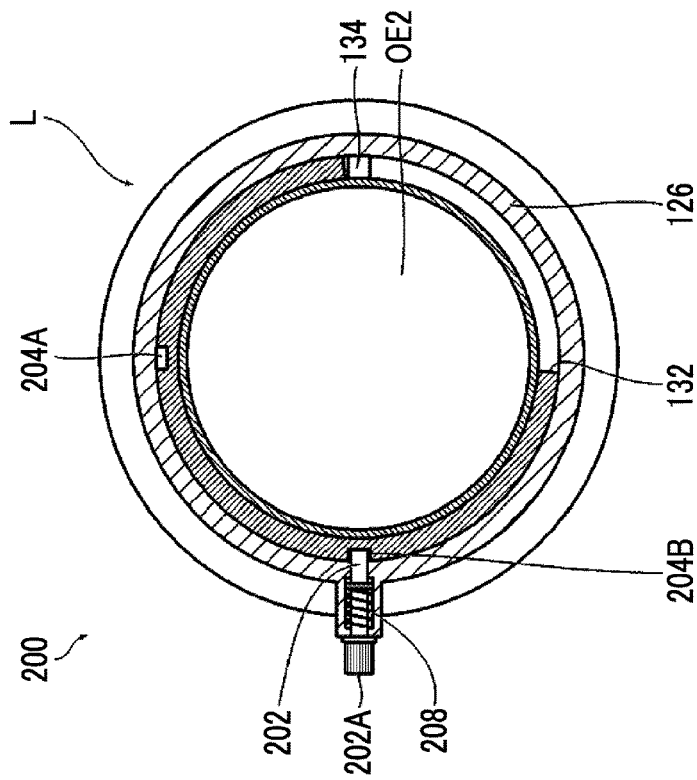
FIG. 22A
FIG. 22B

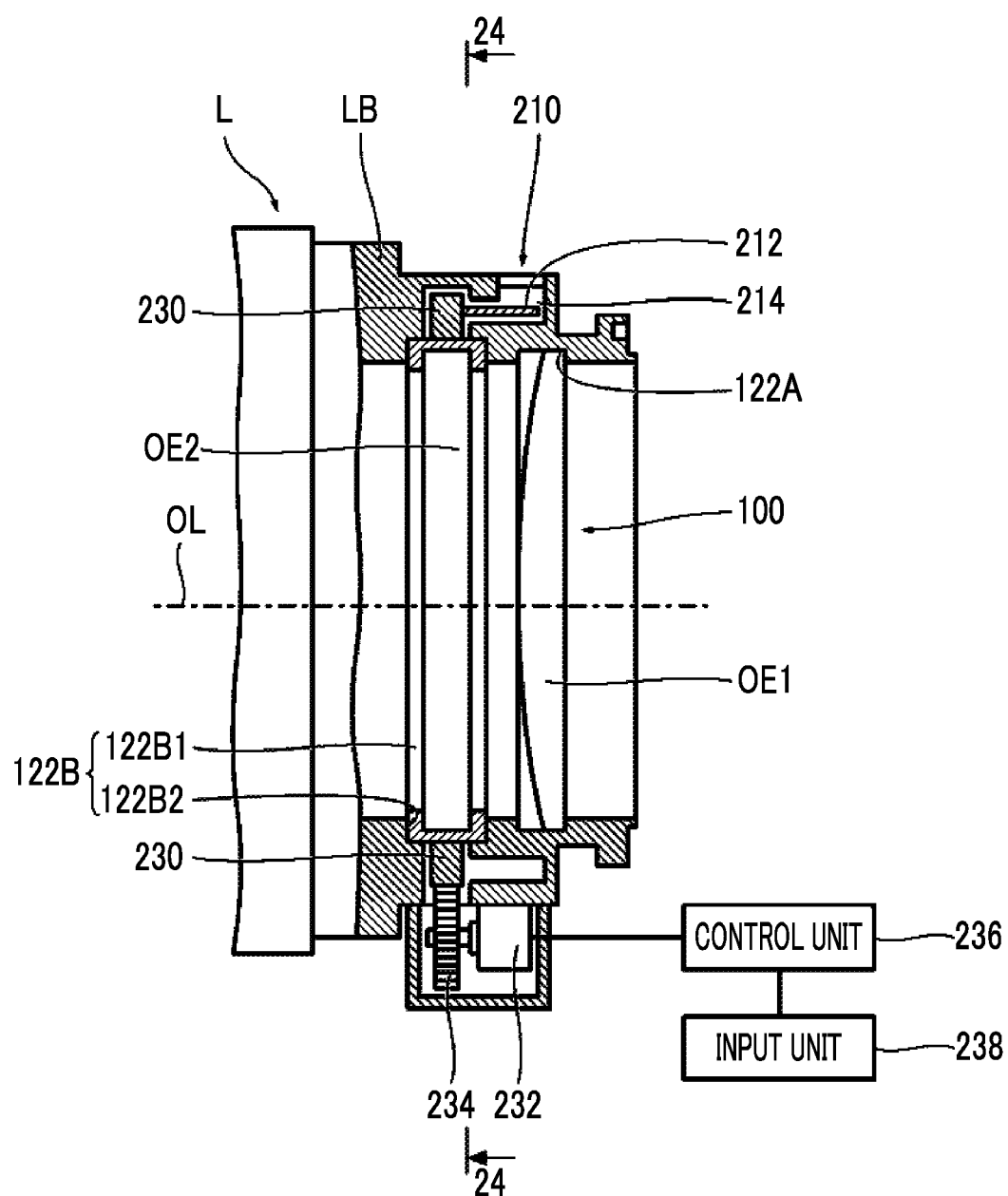

LENS DEVICE, CAMERA SYSTEM, AND ABERRATION CORRECTION UNIT

CROSS-REFERENCE TO RELATED APPLICATIONS

The present application is a Continuation of PCT International Application No. PCT/JP2016/071591 filed on Jul. 22, 2016 claiming priority under 35 U.S.C § 119(a) to Japanese Patent Application No. 2015-183886 filed on Sep. 17, 2015. Each of the above applications is hereby expressly incorporated by reference, in their entirety, into the present application.

BACKGROUND OF THE INVENTION

1. Field of the Invention

The present invention relates to a lens device, a camera system, and an aberration correction unit, and more particularly, to a lens device that is used in both a 3-CCD type camera device and a single-CCD type camera device, a camera system that uses the lens device, and an aberration correction unit that is built in the lens device.

2. Description of the Related Art

A 3-CCD type method and a single-CCD type method are known as a method of taking a color video. The 3-CCD type method is a method of separating an incidence ray into rays having three colors, that is, red, blue, and green with a color separation prism and taking images for the respective colors with three image sensors. The single-CCD type method is a method of taking a video with one image sensor, and takes out colors by using a red color filter, a green color filter, and a blue color filter or a cyan color filter, a magenta color filter, and a yellow color filter on the image sensor. In both methods, a semiconductor imaging element, such as a charged coupled device (CCD) or a complementary metal oxide semiconductor (CMOS), is used as the image sensor.

As long as lens mounts of camera devices have the same specifications, the same lens device can be used in both a 3-CCD type camera device and a single-CCD type camera device in principle. Further, there is also a case where the same lens device can be used in a case in which a lens adapter is used even in a case in which lens mounts have different specifications.

However, since a 3-CCD type camera device includes a color separation prism as a component thereof, there is a problem that an aberration is caused by the color separation prism in a case in which a lens device designed on the premise of the use in a single-CCD type camera device is used in a 3-CCD type camera device. Particularly, in a case in which a color separation prism includes an air gap, there is a problem that astigmatism is caused by the air gap. On the contrary, likewise, there is a problem that an aberration is caused by the absence of a color separation prism in a case in which a lens device designed on the premise of the use in a 3-CCD type camera device is used in a single-CCD type camera device.

A technique for preventing the generation of an aberration by a rear conversion lens having an aberration correction function is proposed in JP2014-170043A as a technique for using a lens device, which is designed on the premise of the use in a 3-CCD type camera device, in a single-CCD type camera device.

SUMMARY OF THE INVENTION

However, there is a drawback in the technique disclosed in JP2014-170043A that a dedicated rear conversion lens is required.

The invention has been made in consideration of the above-mentioned circumstances, and an object of the invention is to provide a lens device that can be used in both a 3-CCD type camera device and a single-CCD type camera device without generating an aberration, a camera system that uses the lens device, and an aberration correction unit that is built in the lens device.

Means for achieving the above-mentioned object are as follows.

(1) There is provided a lens device that is detachably mounted on a 3-CCD type first camera device including a color separation prism and a single-CCD type second camera device. The lens device comprises: an aberration correction unit that corrects an aberration caused by the color separation prism in a case in which the lens device is mounted on the first camera device. The aberration correction unit includes: a first optical element that is disposed on an optical axis of the lens device and generates a first aberration on light having passed through the lens device; a second optical element that is disposed on the optical axis of the lens device and generates a second aberration on the light having passed through the lens device; and an optical element-holding part that holds the first and second optical elements so as to allow the first and second optical elements to be rotatable relative to each other about the optical axis of the lens device. An aberration, which is capable of canceling an aberration caused by the color separation prism, is generated from a synthesis of the first aberration generated by the first optical element and the second aberration generated by the second optical element in a case in which the second optical element is positioned at a first position with respect to the first optical element. The first aberration generated by the first optical element is cancelled by the second aberration generated by the second optical element in a case in which the second optical element is positioned at a second position with respect to the first optical element.

According to this aspect, the lens device includes the aberration correction unit that can correct an aberration caused by the color separation prism. The aberration correction unit includes the first optical element that generates the first aberration on light having passed through the lens device and the second optical element that generates the second aberration on the light having passed through the lens device, and the first and second optical elements are held so as to be rotatable relative to each other about the optical axis. An aberration, which is capable of canceling an aberration caused by the color separation prism, is generated in a case in which the second optical element of the aberration correction unit is positioned at the first position with respect to the first optical element. This aberration is generated from the synthesis of the first aberration generated by the first optical element and the second aberration generated by the second optical element. Further, the first aberration generated by the first optical element is cancelled by the second aberration generated by the second optical element in a case in which the second optical element of the aberration correction unit is positioned at the second position with respect to the first optical element. Accordingly, in a case in which the second optical element is positioned at the first position with respect to the first optical element in a case in which the lens device is to be used in the 3-CCD type first camera device and the second optical element is positioned at the second position with respect to the first optical element in a case in which the lens device is to be used in the single-CCD type second camera device, the lens device can be used without generating an aberration even though the lens device is used in any of the 3-CCD type camera device and the single-CCD type camera device.

(2) In the lens device of (1), the aberration correction unit corrects an aberration that is generated in a case in which the light having passed through the lens device passes through an air gap of the color separation prism.

According to this aspect, particularly, an aberration caused by the air gap of the color separation prism is corrected. An aberration, which can cancel the aberration caused by the air gap of the color separation prism, is generated in a case in which the second optical element of the aberration correction unit is positioned at the first position with respect to the first optical element. This aberration is generated from the synthesis of the first aberration generated by the first optical element and the second aberration generated by the second optical element. Further, the first aberration generated by the first optical element is cancelled by the second aberration generated by the second optical element in a case in which the second optical element of the aberration correction unit is positioned at the second position with respect to the first optical element.

(3) In the lens device of (1) or (2), the optical element-holding part fixedly holds the first optical element and holds the second optical element so as to allow the second optical element to be rotatable.

According to this aspect, the first optical element is fixed and the second optical element is rotatably held. Accordingly, an aberration for cancellation can be generated and removed by only the rotation of the second optical element.

(4) In the lens device of (1) to (3), the aberration correction unit further includes a rotational drive unit that rotates the second optical element to the first position with respect to the first optical element in a case in which the lens device is mounted on the first camera device and rotates the second optical element to the second position with respect to the first optical element in a case in which the lens device is mounted on the second camera device.

According to this aspect, the rotational drive unit, which relatively rotates the second optical element in conjunction with the mounting of the lens device on the camera device, is further provided. In a case in which the lens device is mounted on the first camera device, the rotational drive unit rotates the second optical element to the first position with respect to the first optical element. Further, in a case in which the lens device is mounted on the second camera device, the rotational drive unit rotates the second optical element to the second position with respect to the first optical element. Accordingly, an aberration for cancellation can be automatically generated and removed according to a device on which the lens device is to be mounted.

(5) In the lens device of (4), the rotational drive unit includes: a biasing member that biases the second optical element in a direction in which the second optical element is rotated toward the first position from the second position; a driven member that is provided on the second optical element and includes a tapered surface inclined in a direction of the optical axis of the lens device; and a pressing member that is provided on the second camera device and comes into contact with the tapered surface to press the tapered surface along the optical axis of the lens device and rotate the second optical element to the second position against a biasing force of the biasing member in a case in which the lens device is mounted on the second camera device.

According to this aspect, in a case in which the lens device is mounted on the second camera device, the pressing member provided on the second camera device is in contact with the tapered surface of the driven member, presses the tapered surface, and rotates the driven member. Since the driven member is provided on the second optical element, the second optical element is also rotated in a case in which the driven member is rotated. In this case, the second optical element is rotated against the biasing force of the biasing member and is rotated to the second position. Accordingly, the second optical element is automatically positioned at the second position in conjunction with the mounting of the lens device on the second camera device. In a case in which the lens device is detached from the second camera device, the driven member is rotated in a direction toward the first position by the biasing force of the biasing member. As a result, the second optical element returns to the first position. The pressing member is not mounted on the first camera device. Accordingly, since the driven member is not rotated even though the lens device is mounted on the first camera device, the position of the second optical element is maintained at the first position.

(6) In the lens device of (5), the lens device is mounted on the second camera device through a lens adapter, and the lens adapter is provided with the pressing member.

In a case in which the lens device is mounted on the second camera device through the lens adapter, the lens adapter is provided with the pressing member. Accordingly, the second optical element is automatically positioned at the second position in conjunction with the mounting of the lens device on the lens adapter.

(7) In the lens device of (3), the aberration correction unit further includes a locking mechanism that selectively locks the second optical element at the first position and the second position; and the locking mechanism includes a locking pin that is provided so as to be movable forward and backward in a radial direction of the second optical element, a locking pin-biasing member that biases the locking pin in a direction toward the center of the second optical element, a first locking groove which is provided on the optical element-holding part and to which the locking pin is fitted in a case in which the second optical element is positioned at the first position, and a second locking groove which is provided on the optical element-holding part and to which the locking pin is fitted in a case in which the second optical element is positioned at the second position.

According to this aspect, the locking mechanism, which selectively locks the second optical element at the first position and the second position, is further provided. The optical element-holding part is provided with the first and second locking grooves to which the locking pin can be fitted. In a case in which the second optical element is positioned at the first position, the locking pin is fitted to the first locking groove and the second optical element is locked at the first position. Further, in a case in which the second optical element is positioned at the second position, the locking pin is fitted to the second locking groove and the second optical element is locked at the second position. The locking of the second optical element, which is locked at the first position or the second position, is released in a case in which the locking pin is pulled out of the first and second locking grooves.

(8) There is provided a camera system comprising a 3-CCD type first camera device that includes a color separation prism, a single-CCD type second camera device, and the lens device according to any one of (1) to (7).

According to this aspect, a camera system that uses the same lens device in both a 3-CCD type camera device and a single-CCD type camera device can be built and a video without an aberration can be taken.

(9) There is provided an aberration correction unit that is built in a lens device detachably mounted on a 3-CCD type first camera device including a color separation prism and a single-CCD type second camera device and corrects an aberration caused by the color separation prism in a case in which the lens device is mounted on the first camera device. The aberration correction unit comprises a first optical element that is disposed on an optical axis of the lens device and generates a first aberration on light having passed through the lens device, a second optical element that is disposed on the optical axis of the lens device and generates a second aberration on the light having passed through the lens device, and an optical element-holding part that holds the first and second optical elements so as to allow the first and second optical elements to be rotatable relative to each other about the optical axis of the lens device. An aberration, which is capable of canceling an aberration caused by the color separation prism, is generated from a synthesis of the first aberration generated by the first optical element and the second aberration generated by the second optical element in a case in which the second optical element is positioned at a first position with respect to the first optical element, and the first aberration generated by the first optical element is cancelled by the second aberration generated by the second optical element in a case in which the second optical element is positioned at a second position with respect to the first optical element.

According to this aspect, an aberration caused by the color separation prism can be corrected by the lens device. The aberration correction unit includes the first optical element that generates the first aberration on light having passed through the lens device and the second optical element that generates the second aberration on the light having passed through the lens device, and the first and second optical elements are held so as to be rotatable relative to each other about the optical axis. An aberration, which is capable of canceling an aberration caused by the color separation prism, is generated in a case in which the second optical element of the aberration correction unit is positioned at the first position with respect to the first optical element. This aberration is generated from the synthesis of the first aberration generated by the first optical element and the second aberration generated by the second optical element. Further, the first aberration generated by the first optical element is cancelled by the second aberration generated by the second optical element in a case in which the second optical element of the aberration correction unit is positioned at the second position with respect to the first optical element. Accordingly, in a case in which the second optical element is positioned at the first position with respect to the first optical element in a case in which the lens device is to be used in the 3-CCD type first camera device and the second optical element is positioned at the second position with respect to the first optical element in a case in which the lens device is to be used in the single-CCD type second camera device, the lens device can be used without generating an aberration even though the lens device is used in any of the 3-CCD type camera device and the single-CCD type camera device.

According to the invention, the same lens device can be used in both a 3-CCD type camera device and a single-CCD type camera device without generating an aberration.

BRIEF DESCRIPTION OF THE DRAWINGS

FIG. 8 is a cross-sectional view showing a structure for mounting a lens adapter on the lens device and a camera device.

FIG. 10 is a cross-sectional view of an aberration correction unit.

FIGS. 16A, 16B, and 16C are diagrams illustrating the rotating action of the rotating ring that is obtained from pressing pins.

FIGS. 22A and 22B are diagrams illustrating the action of a modification example of the rotational drive unit.

FIG. 23 is a cross-sectional view showing the structure of the rotational drive unit in a case in which the second optical element is rotated by a motor.

DESCRIPTION OF THE PREFERRED EMBODIMENTS

Preferred embodiments of the invention will be described in detail below with reference to accompanying drawings.

<<Camera System>>
<System Configuration>

Figure 1:
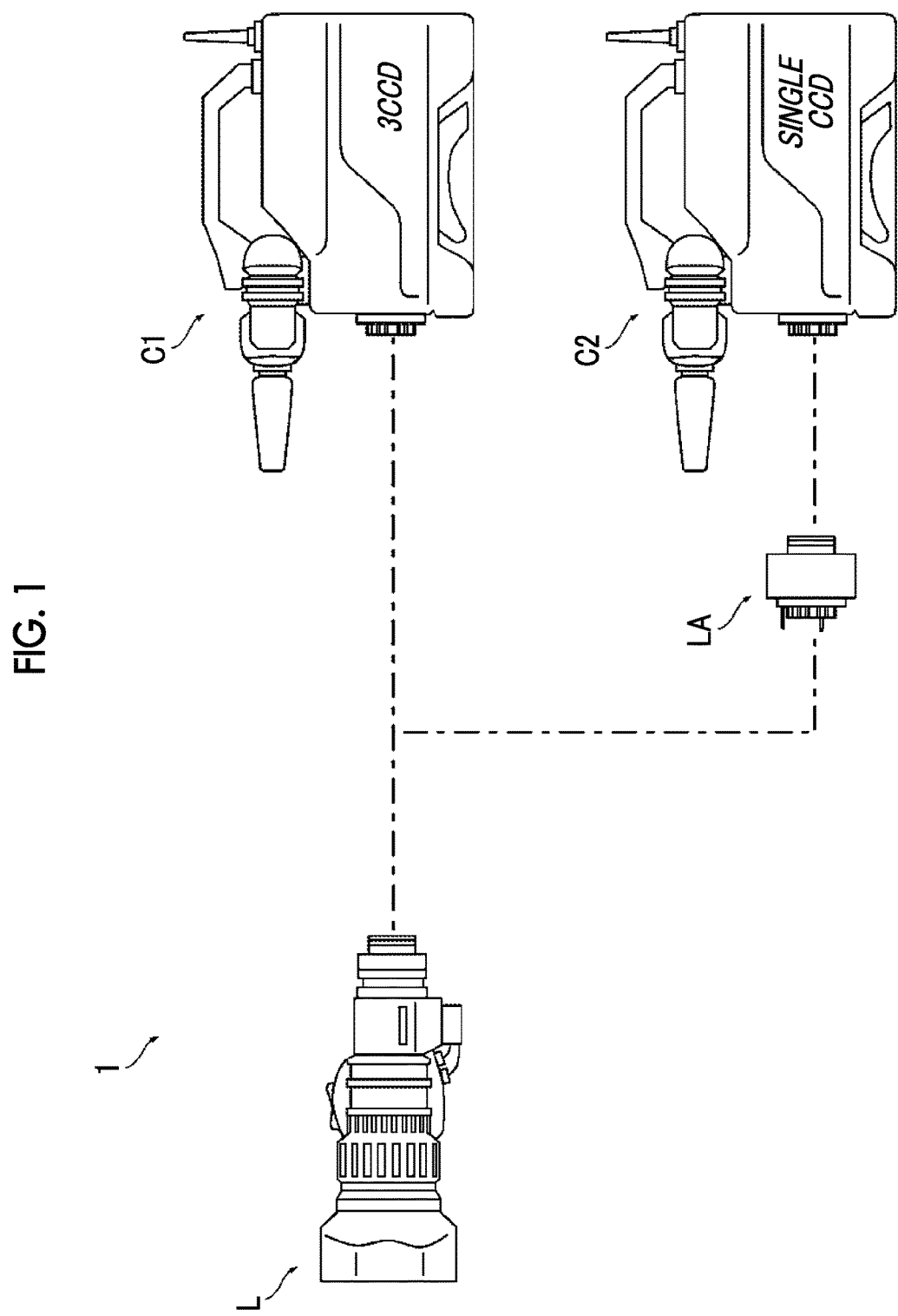
FIG. 1 is a system configuration diagram showing the entire configuration of a camera system.

FIG. 1 is a system configuration diagram showing the entire configuration of a camera system.

A camera system 1 of this embodiment mainly includes a 3-CCD type first camera device C1, a single-CCD type second camera device C2, a lens device L, and a lens adapter LA.

The first camera device C1 is a ⅔-inch format camera device. The ⅔-inch format camera is a camera including a ⅔-inch format image sensor, and the sensor size of the ⅔-inch format camera is about 8.8 mm×6.6 mm. ⅔-inch format is the general format of a camera for broadcast.

The second camera device C2 is a super 35-mm format camera device. The super 35-mm format camera is a camera including a super 35-mm format image sensor, and the sensor size of the super 35-mm format camera is about 23.6 mm×13.3 mm. Super 35-mm format is the general format of a camera for cinema.

The lens device L is a ⅔-inch format lens device having a zoom function. The ⅔-inch format lens device is a lens device designed on the premise that the lens device is used in the ⅔-inch format camera device. The diameter of the image circle of the ⅔-inch format lens device is about 11 mm.

Since the lens device L is a ⅔-inch format lens device, the lens device L cannot be used in a camera device having a sensor size larger than the sensor size of the ⅔-inch format camera. Accordingly, in a case in which the lens device L is to be used in a camera device having a sensor size larger than the sensor size of the ⅔-inch format camera, the lens device L is mounted on the camera device through the lens adapter LA and the image circle of the lens device L is magnified by the lens adapter LA.

In a case in which the lens device L is to be used in the second camera device C2 in the camera system 1 of this embodiment, the lens device L is mounted on the second camera device C2 through the lens adapter LA. The lens adapter LA magnifies the image circle so as to be suitable for a super 35-mm format.

<First Camera Device>

The first camera device C1 of this embodiment is a 3-CCD type camera device. The 3-CCD type camera device separates an incidence ray into rays having three colors, that is, red (R), green (G), and blue (B) with a color separation prism, and takes images for the respective colors with three image sensors.

Figure 2:
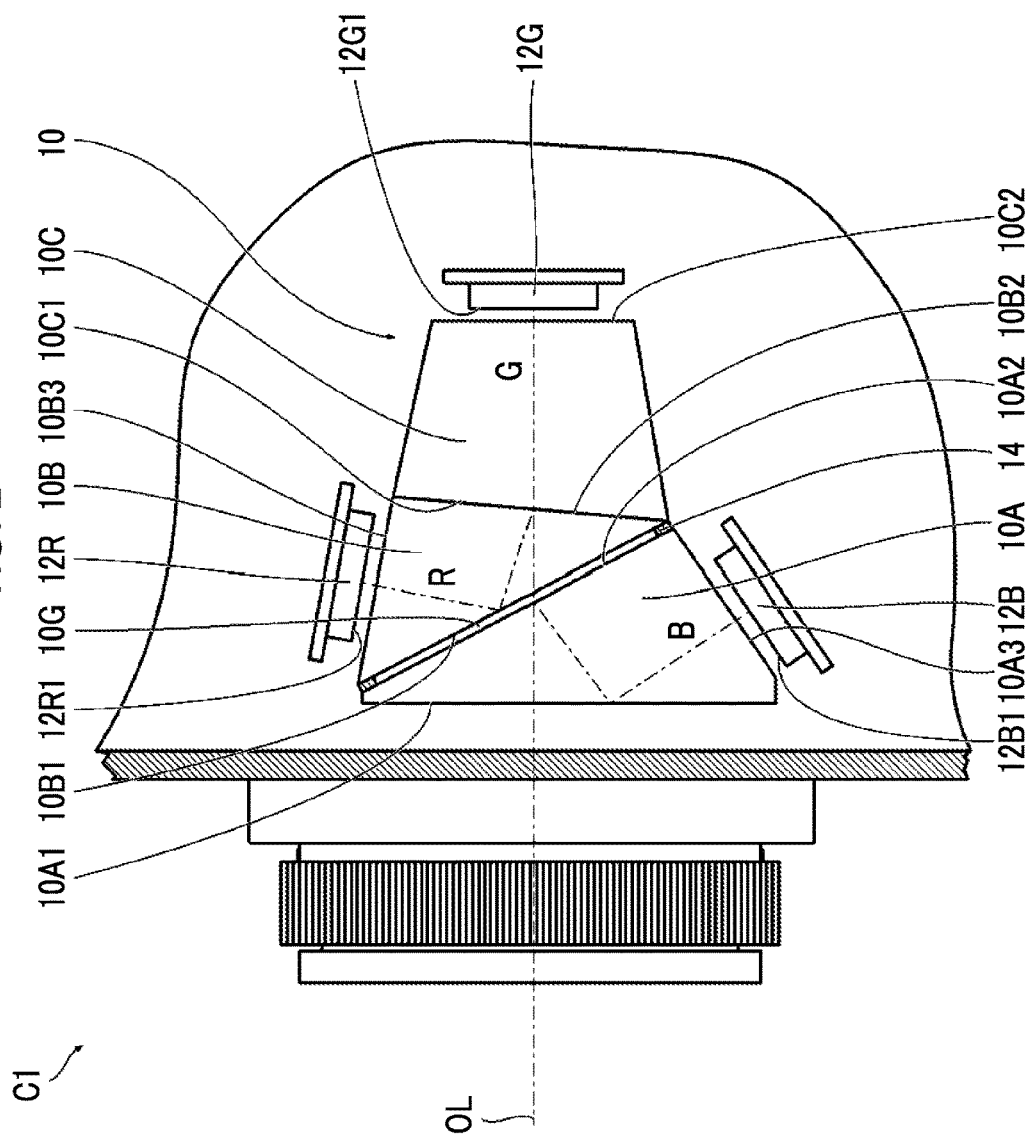
FIG. 2 is a diagram showing the schematic structure of an imaging unit of a first camera device.

FIG. 2 is a diagram showing the schematic structure of an imaging unit of the first camera device.

As shown in FIG. 2, an imaging unit of the first camera device C1 includes a color separation prism 10 and three image sensors 12R, 12G, and 12B.

—Color Separation Prism—

The color separation prism 10 is a composite prism, and is formed by the joining of a first prism 10A, a second prism 10B, and a third prism 10C.

The first prism 10A includes an imaging light-incident surface 10A1, a B-reflective surface 10A2, and a B-emitting surface 10A3.

The imaging light-incident surface 10A1 is disposed so as to be perpendicular to an optical axis OL of the lens device L. The imaging light-incident surface 10A1 is a surface on which light having passed through the lens device L is incident first.

The B-reflective surface 10A2 includes a dichroic film that is provided on the surface thereof and reflects only B light. Only B light of the light, which is incident on the imaging light-incident surface 10A1, is reflected by the B-reflective surface 10A2, and the rest thereof passes through the B-reflective surface 10A2.

The B light, which is reflected by the B-reflective surface 10A2, is totally reflected by the imaging light-incident surface 10A1 and is emitted from the B-emitting surface 10A3. The B light, which is emitted from the B-emitting surface 10A3, is incident on a light-receiving surface 12B1 of the image sensor 12B that receives B light.

The second prism 10B includes an RG-incident surface 10B1, an R-reflective surface 10B2, and an R-emitting surface 10B3.

The RG-incident surface 10B1 is a surface on which light having passed through the B-reflective surface 10A2 of the first prism 10A is incident. The first and second prisms 10A and 10B are joined to each other through a frame-like spacer 14 so that the B-reflective surface 10A2 and the RG-incident surface 10B1 face each other at regular intervals. Accordingly, an air gap 10G is provided between the B-reflective surface 10A2 of the first prism 10A and the RG-incident surface 10B1 of the second prism 10B. Light, which has passed through the B-reflective surface 10A2 of the first prism 10A, passes through the air gap 10G and is incident on the RG-incident surface 10B1 of the second prism 10B.

The R-reflective surface 10B2 includes a dichroic film that is provided on the surface thereof and reflects only R light. Only R light of the light, which is incident on the RG-incident surface 10B1, is reflected by the R-reflective surface 10B2, and the rest thereof passes through the R-reflective surface 10B2.

The R light, which is reflected by the R-reflective surface 10B2, is totally reflected by the RG-incident surface 10B1 and is emitted from the R-emitting surface 10B3. The R light, which is emitted from the R-emitting surface 10B3, is incident on a light-receiving surface 12R1 of the image sensor 12R that receives R light.

The third prism 10C includes a G-incident surface 10C1 and a G-emitting surface 10C2.

The G-incident surface 10C1 is a surface on which light having passed through the R-reflective surface 10B2 of the second prism 10B is incident. The G-incident surface 10C1 is joined to the R-reflective surface 10B2 of the second prism 10B, so that the third prism 10C is integrated with the second prism 10B. This joining is gapless joining, and surfaces to be joined to each other are joined to each other without a gap.

Light, which is incident on the G-incident surface 10C1, is emitted from the G-emitting surface 10C2 as G light. The G light, which is emitted from the G-emitting surface 10C2, is incident on a light-receiving surface 12G1 of the image sensor 12G that receives G light.

—Image Sensor—

The three image sensors 12R, 12G, and 12B are integrally mounted on the color separation prism 10 through holders (not shown). Each of the image sensors 12R, 12G, and 12B, which are mounted on the color separation prism 10, is disposed so as to face the emitting surface corresponding to a corresponding color. Further, the respective image sensors 12R, 12G, and 12B are disposed so that light passing along the optical axis OL of the lens device L is incident on the centers of the light-receiving surfaces 12R1, 12G1, and 12B1 so as to be perpendicular to the light-receiving surfaces 12R1, 12G1, and 12B1. Further, the respective image sensors 12R, 12G, and 12B are disposed so as to have the same length of an optical path from the imaging light-incident surface 10A1 of the color separation prism 10.

A semiconductor imaging element, such as a CCD or a CMOS, is used as each of the image sensors 12R, 12G, and 12B. A CCD image sensor is used in this embodiment. A 3-CCD type camera device in which a CCD is used as each of the image sensors is referred to as a 3-CCD type camera.

Since the first camera device C1 is the ⅔-inch format camera device as described above, the ⅔-inch format image sensor is used as each of the image sensors 12R, 12G, and 12B.

<Second Camera Device>

The second camera device C2 of this embodiment is a single-CCD type camera device. The single-CCD type camera device takes a color video with one image sensor that includes a color filter.

Figure 3:
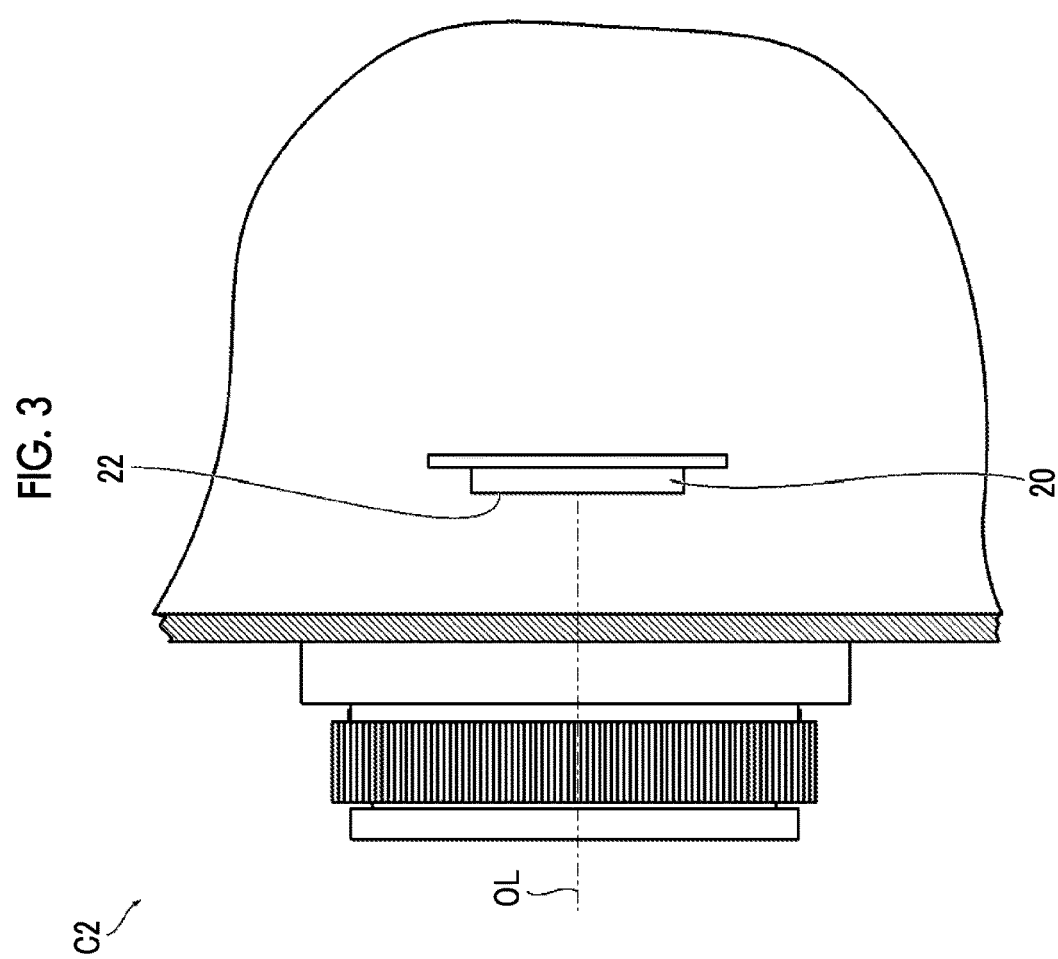
FIG. 3 is a diagram showing the schematic structure of an imaging unit of a second camera device.

FIG. 3 is a diagram showing the schematic structure of an imaging unit of the second camera device.

As shown in FIG. 3, the second camera device C2 includes one image sensor 20 in the imaging unit thereof. The image sensor 20 is disposed at a constant position in the device through a holder (not shown). In this case, the image sensor 20 is disposed so that light passing along the optical axis OL of the lens device L is incident on the center of a light-receiving surface 22 so as to be perpendicular to the light-receiving surface 22.

A semiconductor imaging element, such as a CCD or a CMOS, including a color filter, is used as the image sensor 20. A CCD image sensor including a color filter is used in this embodiment. For example, color filters having three colors, that is, a red, a green, and a blue, are disposed in the color filter so as to have an array, such as Bayer array.

As described above, the second camera device C2 is the super 35-mm format camera device and a super 35-mm format image sensor is used as the image sensor 20.

<Lens Device>

The lens device L of this embodiment is a ⅔-inch format lens device having a zoom function.

Figure 4:
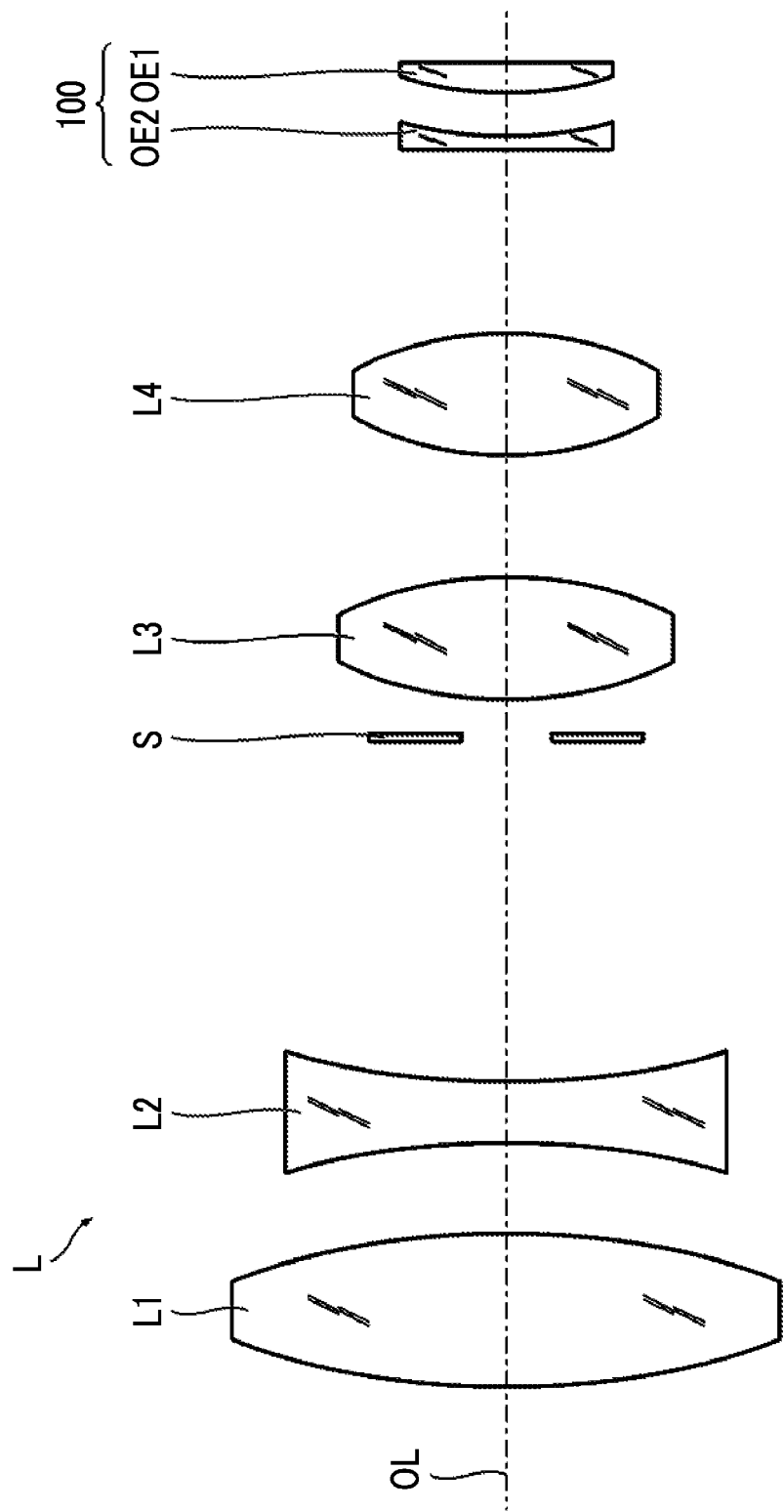
FIG. 4 is a diagram showing the schematic structure of a lens device.

FIG. 4 is a diagram showing the schematic structure of the lens device.

As shown in FIG. 4, the lens device L of this embodiment is composed of a zoom lens device having a 4-group structure and includes a first lens group L1 having a positive refractive power, a second lens group L2 having a negative refractive index, a third lens group L3 having a positive refractive power, and a fourth lens group L4 having a positive refractive power. The first lens group L1, the second lens group L2, the third lens group L3, and the fourth lens group L4 are arranged in this order from an object along the optical axis OL. Each of the lens groups is composed of a combination of a plurality of lenses.

The lens device L of this embodiment is a rear focus type zoom lens device, and the first and third lens groups L1 and L3 are fixed. The second lens group is movable to change a magnification. Further, the fourth lens group L4 is movable to correct the movement of an image surface caused by a change in magnification and to adjust a focus. The lens device L is provided with a second lens group-drive mechanism (not shown) that is used to move the second lens group along the optical axis OL and a fourth lens group-drive mechanism (not shown) that is used to move the fourth lens group L4 along the optical axis OL.

A diaphragm S, which is used to adjust the amount of light, is provided between the second and third lens groups L2 and L3. The lens device L is provided with a diaphragm drive mechanism (not shown) that is used to increase and reduce the aperture of the diaphragm S.

An aberration correction unit 100, which is used to correct an aberration caused by the color separation prism 10 in a case in which the lens device L is mounted on the first camera device C1, is provided on the subsequent stage of the fourth lens group L4. The aberration correction unit 100 corrects an aberration, which is caused by the color separation prism 10, by generating an aberration for canceling the aberration that is caused by the color separation prism 10. An aberration for cancellation can be arbitrarily generated and removed. Accordingly, it is possible to use the lens device L without generating an aberration in both the camera devices by generating an aberration for cancellation in a case in which the lens device L is mounted on the first camera device C1 and removing an aberration for cancellation in a case in which the lens device L is mounted on the second camera device C2.

The structure of the aberration correction unit 100 will be described in detail later.

<Lens Adapter>

The lens adapter LA is used in a case in which the lens device L is used in the second camera device C2. The lens adapter LA includes a magnification/conversion optical system that is provided in a housing (not shown) and magnifies the image circle of the lens device L. Specifically, the magnification/conversion optical system magnifies a ⅔-inch format image circle to a super 35-mm format image circle.

<Lens Mount>

The lens device L is detachably mounted on the first and second camera devices C1 and C2 through a lens mount.

The lens mount includes a female lens mount 50 that is provided on a camera device side and a male lens mount 60 that is provided on a lens device side.

Figure 5:
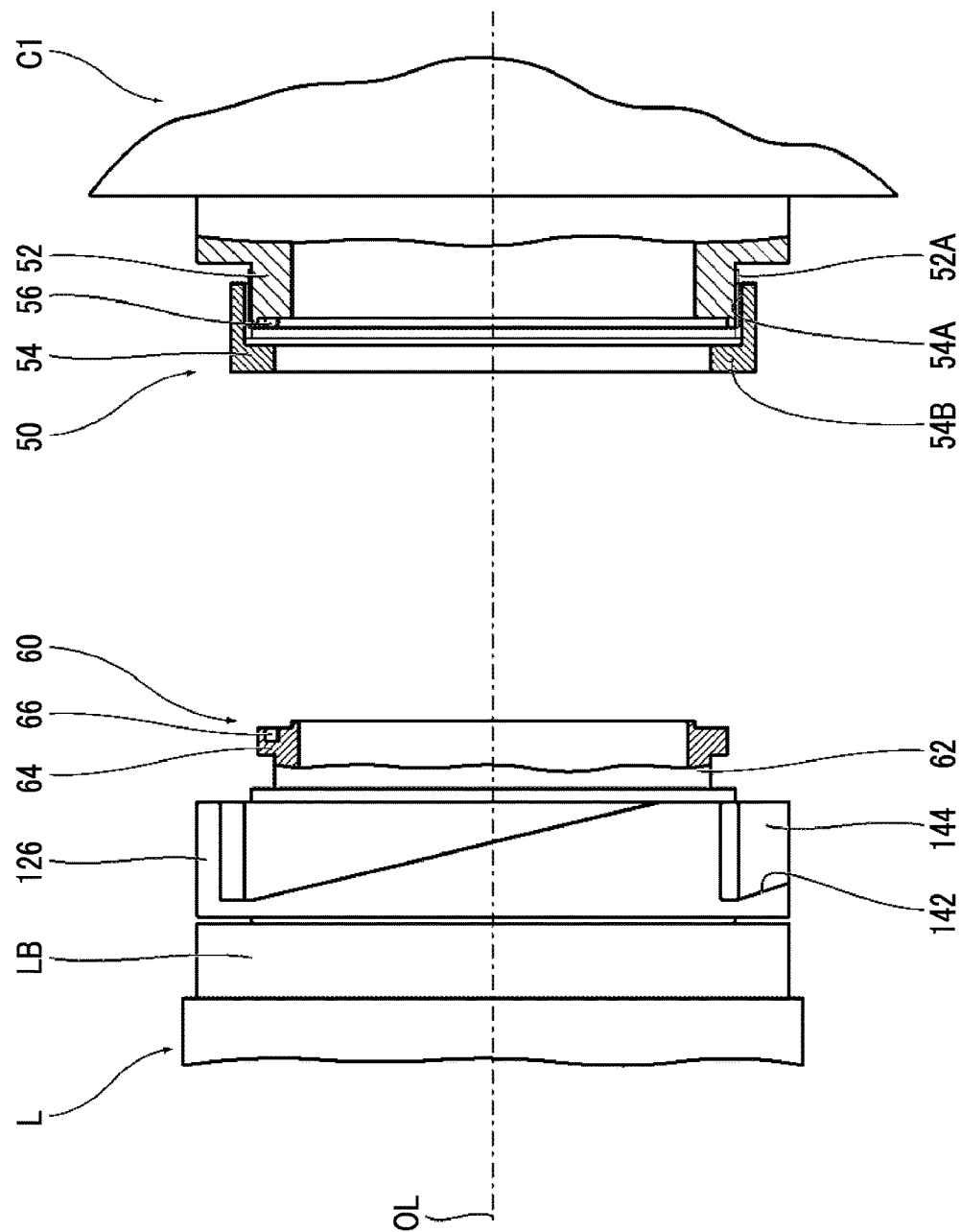
FIG. 5 is a cross-sectional view of a lens mount.

FIG. 5 is a cross-sectional view of the lens mount. Further, FIG. 6 is a front view of the female lens mount, and FIG. 7 is a front view of the male lens mount.

—Female Lens Mount—

Figure 6:
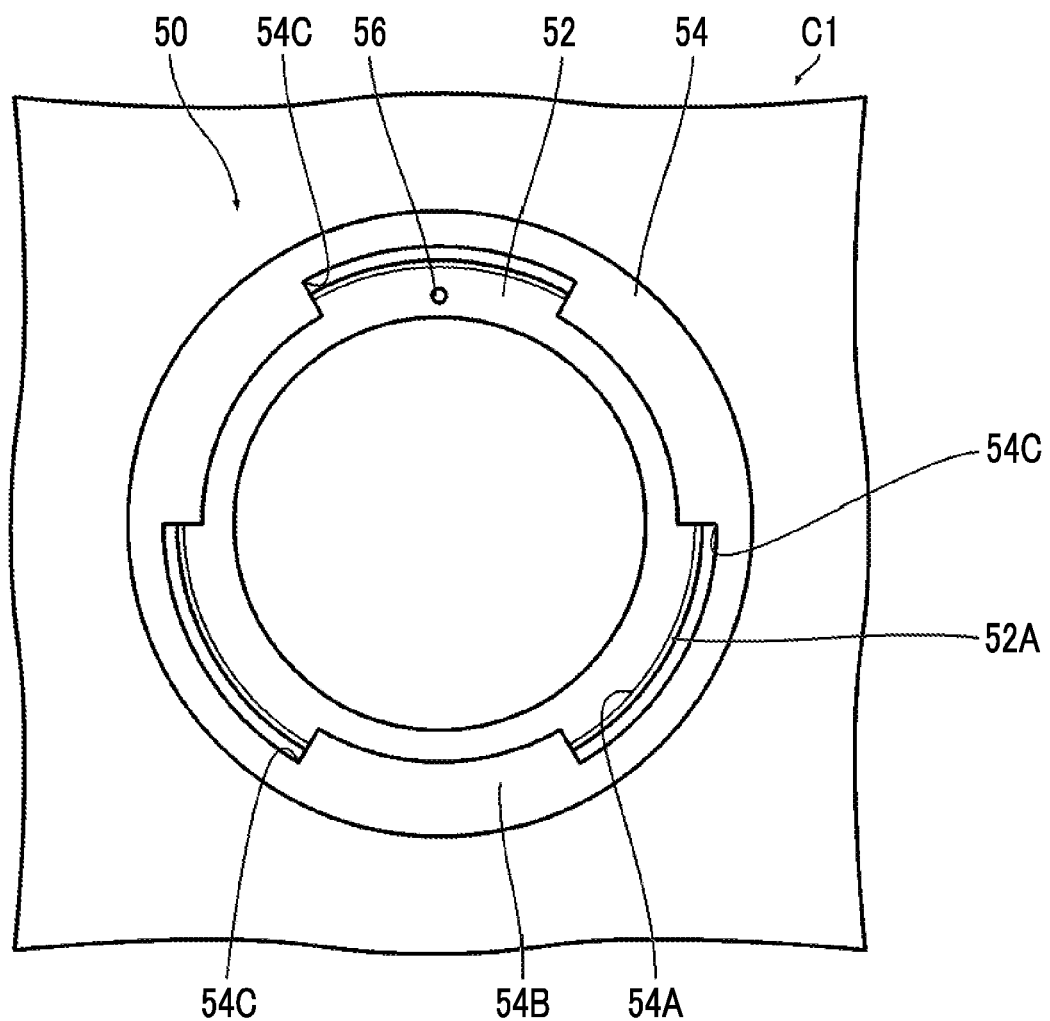
FIG. 6 is a front view of a female lens mount.
Figure 7:
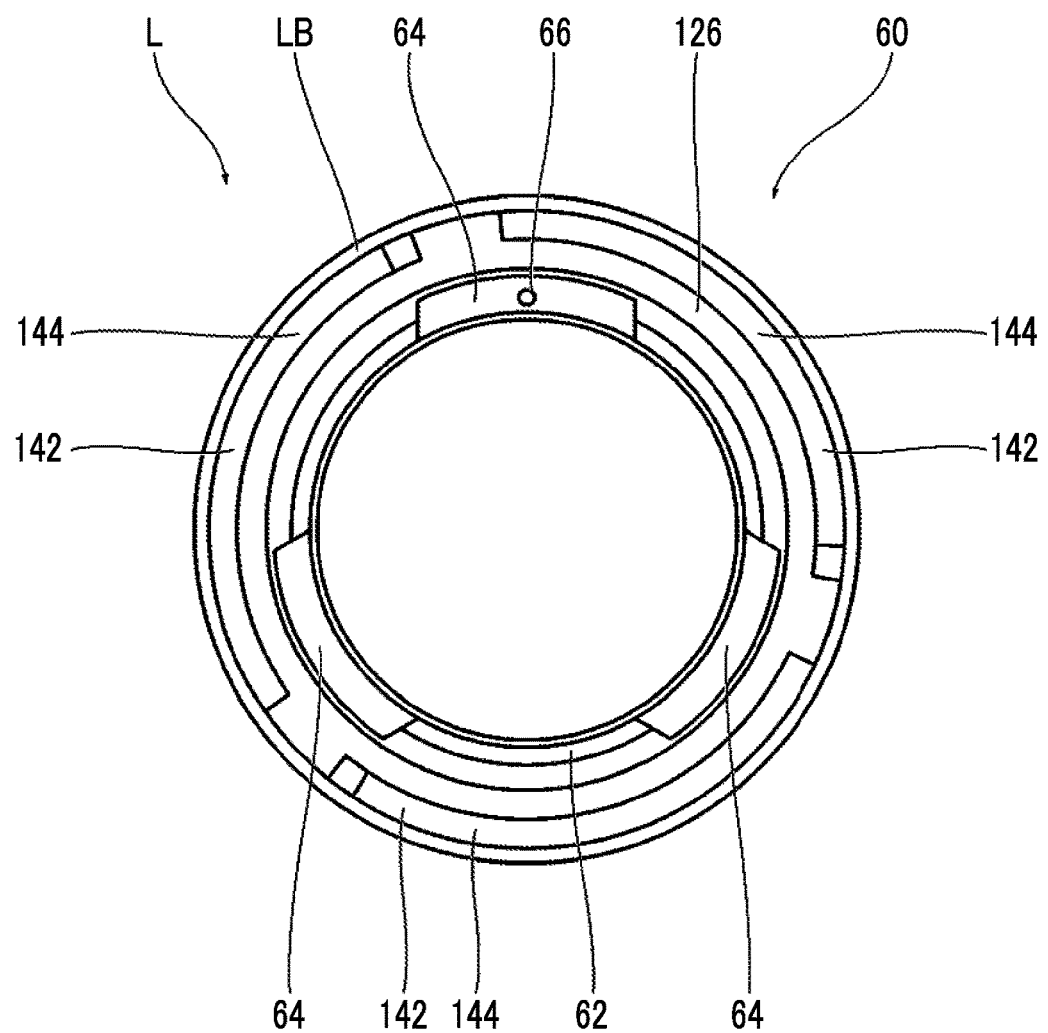
FIG. 7 is a front view of a male lens mount.

As shown in FIGS. 5 and 6, the female lens mount 50 provided on the camera device side includes a lens seat 52, a mount ring 54, and a positioning pin 56.

The lens seat 52 has the shape of a ring, and is integrally mounted on a body frame MF of each of the first and second camera devices C1 and C2. The lens seat 52 includes a male screw portion 52A that is provided on the outer peripheral surface thereof.

The mount ring 54 has the shape of a ring, and includes a female screw portion 54A that is provided on the inner peripheral surface thereof. The female screw portion 54A of the inner periphery of the mount ring 54 is screwed to the male screw portion 52A of the outer periphery of the lens seat 52, so that the mount ring 54 is mounted on the outer periphery of the lens seat 52. The mount ring 54 includes a lens fixing portion 54B that is provided at a distal end thereof. The lens fixing portion 54B has a shape where the distal end portion of the mount ring 54 is bent inward, and includes notches 54C that are provided at three portions thereof in a circumferential direction. The notches 54C are arranged at regular intervals.

The positioning pin 56 is provided on the lens seat 52. The positioning pin 56 is disposed in parallel to the optical axis OL of the lens device L mounted on the first and second camera devices C1 and C2, and is provided so as to protrude from the lens seat 52.

—Male Lens Mount—

As shown in FIGS. 5 and 7, the male lens mount 60 provided on the lens device side includes a mount base 62, bayonet claws 64, and a positioning hole 66.

The mount base 62 has the shape of a ring, and is integrally mounted on the rear end of a lens barrel LB of the lens device L.

The bayonet claws 64 are arranged at regular intervals at three positions on the outer peripheral portion of the mount base 62.

The positioning hole 66 is a hole that is used to position the lens device relative to the camera device, and is provided at the end surface of the mount base 62. The positioning hole 66 is formed along the optical axis OL of the lens device L.

—Method of Mounting Lens Device—

In a case in which the lens device L is to be mounted, the position of the mount ring 54 is adjusted on the camera device side first. The position of the mount ring 54 is adjusted so that the positions of the notches 54C relative to the positioning pin 56 are the same as the positions of the bayonet claws 64 relative to the positioning hole 66. After the adjustment of the position of the mount ring 54, the mount base 62 of the lens device L is seated on the lens seat 52. In this case, the mount base 62 is seated on the lens seat 52 so that the position of the positioning pin 56 and the position of the positioning hole 66 are aligned with each other. Accordingly, the positioning pin 56 is fitted to the positioning hole 66, so that the lens device is positioned. After that, the mount ring 54 is rotated so that the mount ring 54 is tightened. Accordingly, the bayonet claws 64 are interposed between the lens seat 52 and the lens fixing portion 54B of the mount ring 54, and are fixed to the lens seat 52.

In a case in which the lens device L is to be detached, the mount ring 54 is rotated in a direction in which the mount ring 54 is loosened so that the positions of the notches 54C of the mount ring 54 are aligned with the positions of the bayonet claws 64. Accordingly, the lens device L can be detached from the camera device.

—Mounting of Lens Adapter—

FIG. 8 is a cross-sectional view showing a structure for mounting the lens adapter on the lens device and the camera device.

The lens adapter LA is also mounted on the lens device and the camera device through the lens mount. The lens adapter LA includes the female lens mount 50 that is provided on the side thereof to be mounted on the lens device, and the male lens mount 60 that is provided on the side thereof to be mounted on the camera device.

<<Aberration Correction Unit>>

The lens device L is provided with the aberration correction unit 100 that is used to correct an aberration caused by the color separation prism 10 in a case in which the lens device L is mounted on the first camera device C1.

—Aberration Caused by Color Separation Prism—

An aberration caused by the color separation prism is mainly astigmatism. This aberration is caused by the air gap of the color separation prism. That is, this aberration is caused by the fact that the air gap is disposed obliquely with respect to the optical axis. Since the air gap is disposed obliquely with respect to the optical axis, the length of the optical path of light passing along the optical axis and the length of the optical path of light passing through a portion of the color separation prism near the optical axis are changed. As a result, astigmatism is generated.

—Outline of Correction of Aberration Performed by Aberration Correction Unit—

The aberration correction unit corrects an aberration, which is caused by the color separation prism, by intentionally generating an aberration on light having passed through the lens device. An aberration to be generated is an aberration that can cancel an aberration caused by the color separation prism. That is, the aberration correction unit corrects an aberration by canceling the aberration, which is caused by the color separation prism, with the aberration that is intentionally generated.

However, in a case in which an aberration is intentionally generated, an aberration remains in a case in which the lens device is used in a camera device not including a color separation prism.

Accordingly, the aberration correction unit of this embodiment is adapted to be capable of generating and removing an aberration for cancellation. Specifically, the aberration correction unit of this embodiment uses a combination of a first optical element that generates a first aberration on light having passed through the lens device and a second optical element that generates a second aberration on light having passed through the lens device, and generates or removes an aberration for cancellation by adjusting the rotational positions of the first and second optical elements relative to each other. In a case in which the second optical element is positioned at a first position with respect to the first optical element, an aberration, which can cancel an aberration caused by the color separation prism, is generated in the first and second optical elements from a synthesis of the first aberration generated by the first optical element and the second aberration generated by the second optical element. On the other hand, in a case in which the second optical element is positioned at a second position with respect to the first optical element, the first aberration generated by the first optical element is cancelled by the second aberration generated by the second optical element.

Figure 9B:
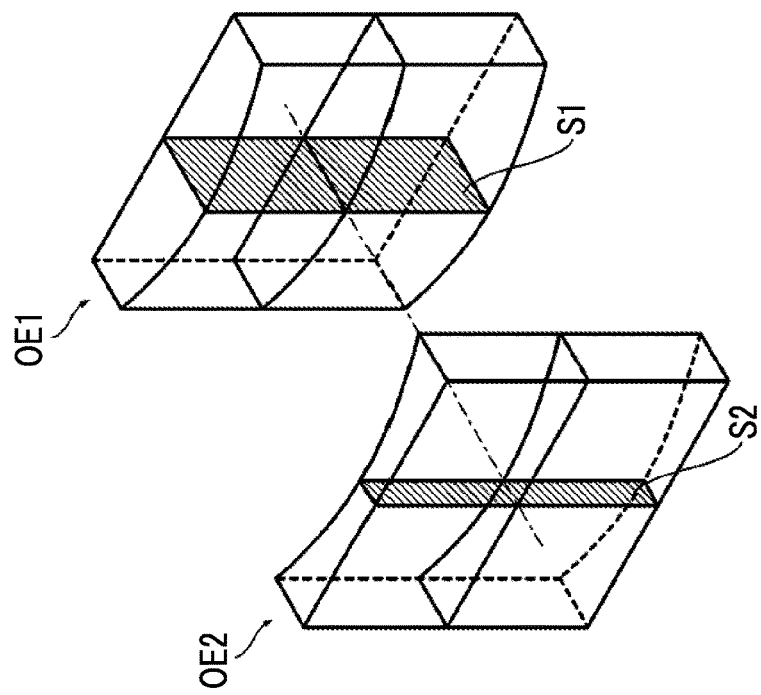
FIGS. 9A and 9B are conceptual diagrams in which an aberration for cancellation is generated and removed.
Figure 9A:
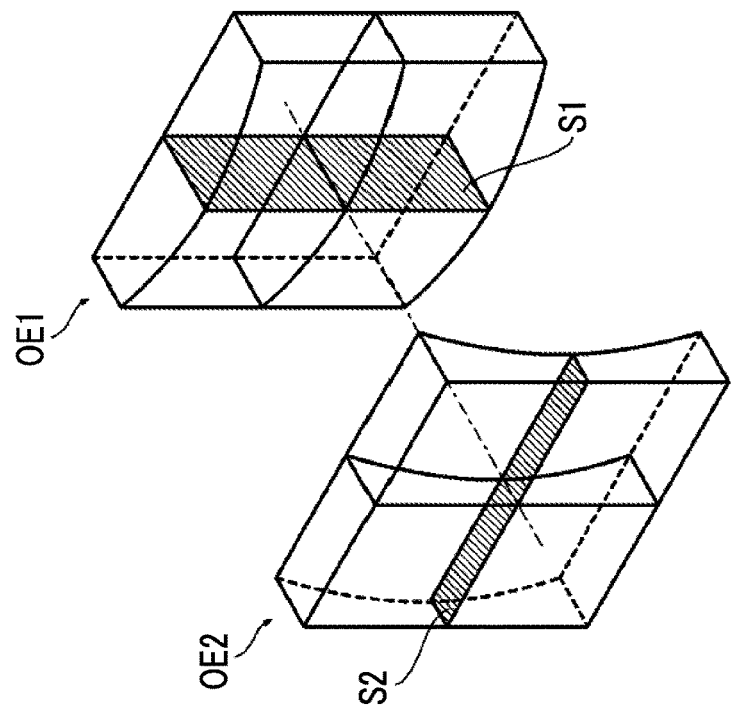

FIGS. 9A and 9B are conceptual diagrams in which an aberration for cancellation is generated and removed.

A first optical element OE1 is composed of a cylindrical lens having a convex cylindrical surface, and a second optical element OE2 is composed of a cylindrical lens having a concave cylindrical surface. The first and second optical elements OE1 and OE2 are disposed on the same optical axis.

Each cylindrical lens has a cross-section not having a curved surface. The cross-section of the first optical element OE1 not having a curved surface is denoted by S1, and the cross-section of the second optical element OE2 not having a curved surface is denoted by S2.

Here, a state in which the cross-section S1 of the first optical element OE1 and the cross-section S2 of the second optical element OE2 are orthogonal to each other as shown in FIG. 9A is referred to as a first mode, and a state in which the cross-section S1 of the first optical element OE1 and the cross-section S2 of the second optical element OE2 are parallel to each other as shown in FIG. 9B is referred to as a second mode. Further, the first and second optical elements OE1 and OE2 are set to the first mode in a case in which the second optical element OE2 is positioned at the first position with respect to the first optical element OE1, and are set to the second mode in a case in which the second optical element OE2 is positioned at the second position with respect to the first optical element OE1.

As shown in FIG. 9A, in the first mode, an aberration, which is generated from a synthesis of the first aberration generated by the first optical element OE1 and the second aberration generated by the second optical element OE2, is generated on light passing through the first and second optical elements OE1 and OE2. This aberration is an aberration that can cancel an aberration caused by the color separation prism.

On the other hand, as shown in FIG. 9B, in the second mode, the first aberration generated by the first optical element OE1 is cancelled by the second aberration generated by the second optical element OE2. Accordingly, an aberration is not generated on light passing through the first and second optical elements OE1 and OE2.

It is possible to generate or remove an aberration for cancellation by adjusting a relationship between the rotational positions of the first and second optical elements OE1 and OE2 in this way.

—Correction of Aberration Caused by Color Separation Prism—

An aberration caused by the color separation prism is mainly astigmatism as described above. This aberration can be satisfactorily corrected by the use of a combination of the cylindrical lens having a concave cylindrical surface and the cylindrical lens having a convex cylindrical surface. That is, this aberration can be satisfactorily cancelled by an aberration that is generated from a synthesis of an aberration generated by the cylindrical lens having a concave cylindrical surface and an aberration generated by the cylindrical lens having a convex cylindrical surface. Accordingly, an aberration caused by the color separation prism can be corrected in a case in which one of the first and second optical elements is composed of the cylindrical lens having a concave cylindrical surface and the other thereof is composed of the cylindrical lens having a convex cylindrical surface.

Specifically, the amount of astigmatism, which can be allowed in terms of an optical design, is calculated from the F-number of the lens device L and the pixel size of the image sensor, and astigmatism caused by the color separation prism is corrected so as to be equal to or smaller than the calculated amount of astigmatism. That is, an aberration for cancellation is generated so that astigmatism is equal to or smaller than the amount of astigmatism, which can be allowed in terms of an optical design, and astigmatism is corrected. The reason why the F-number and the pixel size are considered is that the F-number and the pixel size are related to the spot diameter and the resolving power of the lens.

An aberration caused by the air gap is generated on only light passing through the air gap. Lights having two colors among lights having three colors pass through the air gap in the color separation prism that separates light into lights having three colors as described above. In this case, in a case in which an aberration for cancellation is generated on light not passing through the air gap, the aberration remains.

The color separation prism is adapted as described below to cope with this. That is, the color separation prism is adapted so that blue light does not pass through the air gap, by the use of the fact that green light mainly contributes a resolving power from human visibility characteristics and the fact that the human visibility characteristics of blue light are low. In this case, an aberration for cancellation remains on blue light but the human visibility characteristics of blue light is low as described above. Accordingly, an influence of an aberration on a video, in a case in which the video is appreciated as a whole, can be suppressed to the minimum.

—Structure of Aberration Correction Unit—

Figure 11:
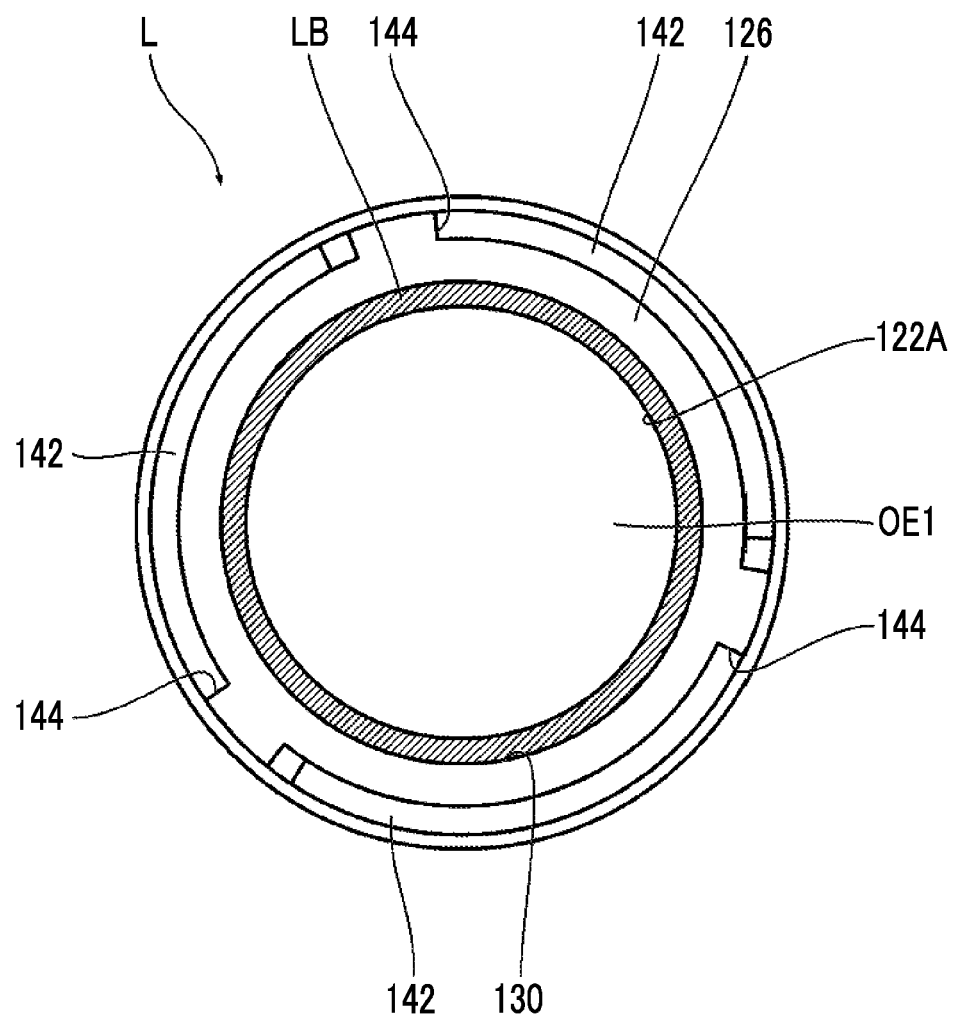
FIG. 11 is a cross-sectional view taken along line 11-11 of FIG. 10.
Figure 12:
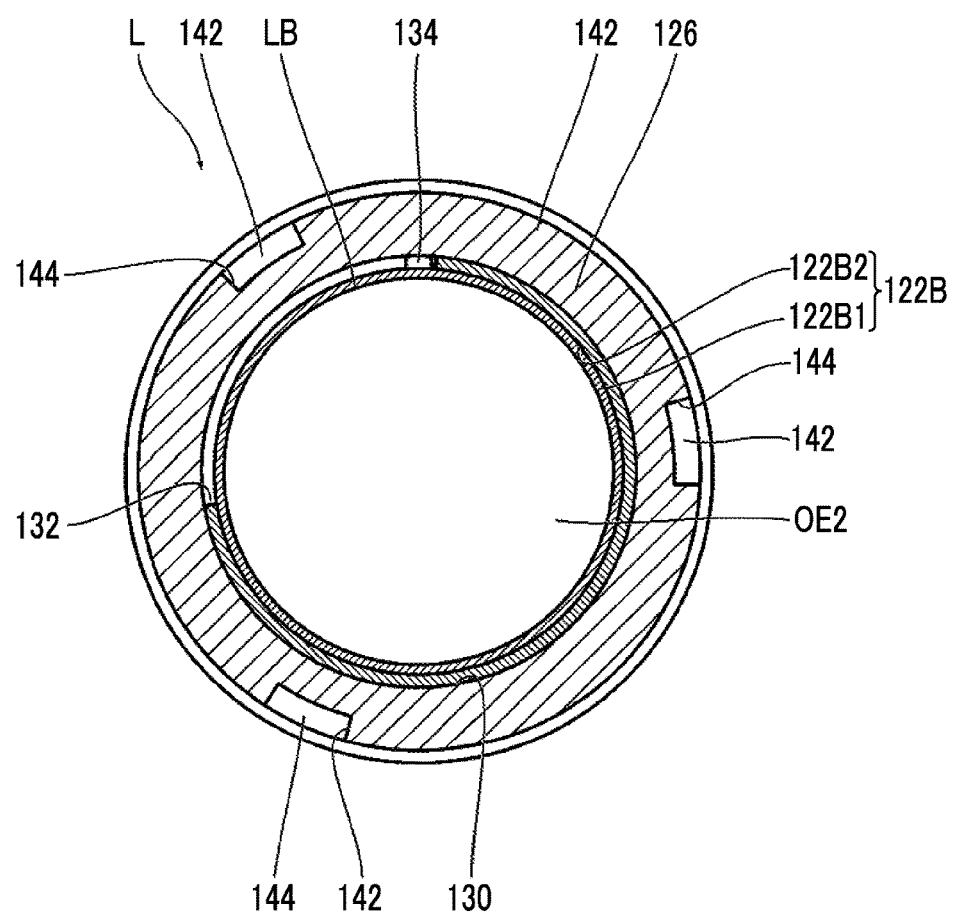
FIG. 12 is a cross-sectional view taken along line 12-12 of FIG. 10.
Figure 13:
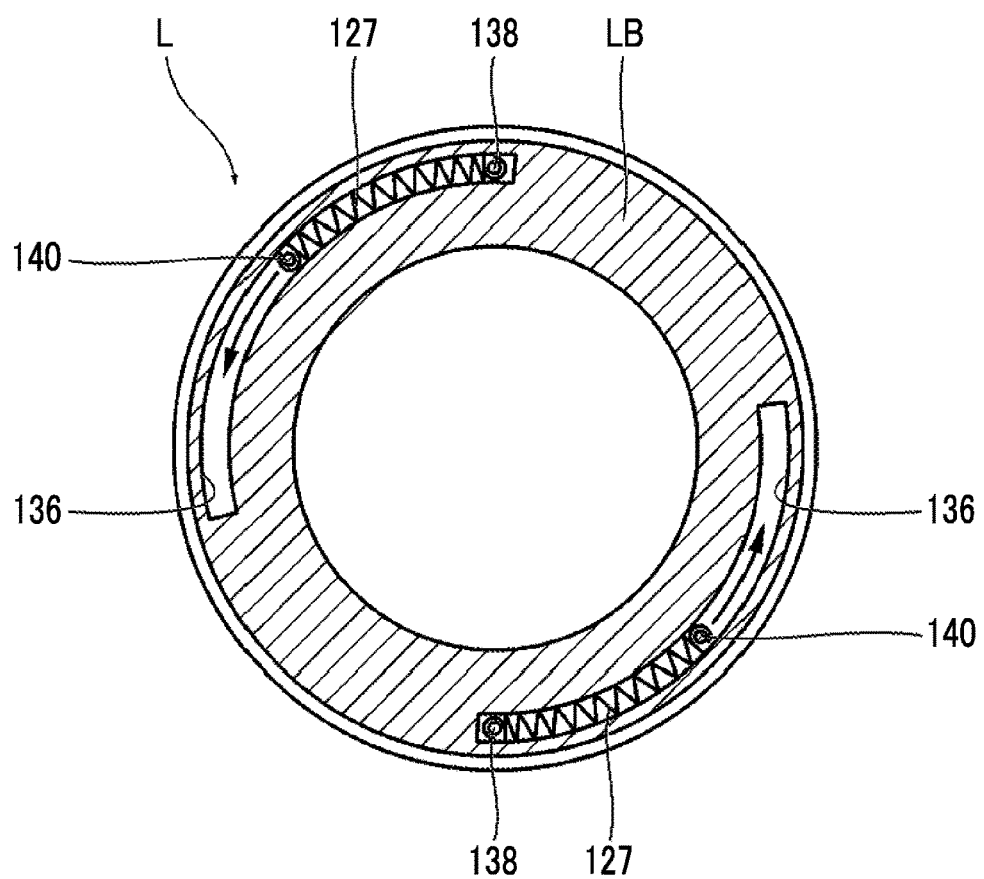
FIG. 13 is a cross-sectional view taken along line 13-13 of FIG. 10.

FIG. 10 is a cross-sectional view of the aberration correction unit. FIG. 11 is a cross-sectional view taken along line 11-11 of FIG. 10. FIG. 12 is a cross-sectional view taken along line 12-12 of FIG. 10. FIG. 13 is a cross-sectional view taken along line 13-13 of FIG. 10.

The aberration correction unit 100 includes: the first optical element OE1 that generates a first aberration on light having passed through the lens device L; the second optical element OE2 that generates a second aberration on light having passed through the lens device L; an optical element-holding part 122 that holds the first and second optical elements OE1 and OE2 so as to allow the first and second optical elements OE1 and OE2 to be rotatable relative to each other about the optical axis OL of the lens device L; and a rotational drive unit 124 that rotates the second optical element OE2 to the first position with respect to the first optical element OE1 in a case in which the lens device L is mounted on the first camera device C1 and rotates the second optical element OE2 to the second position with respect to the first optical element OE1 in a case in which the lens device L is mounted on the second camera device C2.

[First and Second Optical Elements]

The first optical element OE1 is composed of a disk-shaped cylindrical lens having a convex cylindrical surface, and is disposed on the optical axis OL of the lens device L.

The second optical element OE2 is composed of a disk-shaped cylindrical lens having a concave cylindrical surface, and is disposed on the optical axis OL of the lens device L.

The first and second optical elements OE1 and OE2 are set to the first mode in a case in which the second optical element OE2 is positioned at the first position with respect to the first optical element OE1, and are set to the second mode in a case in which the second optical element OE2 is positioned at the second position with respect to the first optical element OE1.

In a case in which the first and second optical elements OE1 and OE2 are set to the first mode, an aberration, which is generated from a synthesis of the first aberration generated by the first optical element OE1 and the second aberration generated by the second optical element OE2, is generated on light passing through the first and second optical elements OE1 and OE2. This aberration is an aberration that can cancel an aberration caused by the color separation prism.

On the other hand, in a case in which the first and second optical elements OE1 and OE2 are set to the second mode, the first aberration generated by the first optical element OE1 is cancelled by the second aberration generated by the second optical element OE2.

[Optical Element-Holding Part]

The optical element-holding part 122 includes a first optical element-holding portion 122A that holds the first optical element OE1 and a second optical element-holding portion 122B that holds the second optical element OE2.

The first optical element-holding portion 122A fixedly holds the first optical element OE1. The first optical element-holding portion 122A is formed of a groove that is provided on the inner peripheral portion of the lens barrel LB. The outer peripheral portion of the first optical element OE1 is fitted to the first optical element-holding portion 122A, so that the first optical element OE1 is fixed and held at a constant position inside the lens barrel LB.

The second optical element-holding portion 122B holds the second optical element OE2 so as to allow the second optical element OE2 to be rotatable about the optical axis OL. The second optical element-holding portion 122B includes a second optical element-holding frame 122B1 that holds the second optical element OE2 and a second optical element-holding groove 122B2 that holds the second optical element-holding frame 122B1 so as to allow the second optical element-holding frame 122B1 to be rotatable. The second optical element-holding frame 122B1 is formed of an annular frame body, and holds the second optical element OE2 on the inner peripheral portion thereof. The second optical element OE2 is fitted to the inner peripheral portion of the second optical element-holding frame 122B1, and is integrally held by the second optical element-holding frame 122B1. The second optical element-holding groove 122B2 is formed of a groove that is provided on the inner peripheral portion of the lens barrel LB. The second optical element-holding frame 122B1 is fitted to the second optical element-holding groove 122B2 and is held so as to be rotatable about the optical axis OL.

[Rotational Drive Unit]

The rotational drive unit 124 mainly includes a rotating ring 126 that is connected to the second optical element OE2 and rotates the second optical element OE2, rotating ring-biasing springs 127 that bias the rotating ring 126 in the circumferential direction, and pressing pins 128 that rotate the rotating ring 126.

—Rotating Ring—

The rotating ring 126 is an example of a driven member. The rotating ring 126 has the shape of a ring and is rotatably held on the outer periphery of the lens barrel LB. A rotating ring-holding groove 130, which holds the rotating ring 126 so as to allow the rotating ring 126 to be rotatable, is provided on the outer periphery of the lens barrel LB. The rotating ring 126 is fitted to the rotating ring-holding groove 130, and is held so as to be rotatable about the optical axis OL.

As shown in FIG. 12, the rotating ring-holding groove 130 includes a slit 132 that is provided on a part of the bottom thereof. The slit 132 is formed along the circumferential direction, and is formed so as to pass through the lens barrel LB. The rotating ring 126 is connected to the second optical element-holding frame 122B1 through the slit 132 by a connecting pin 134. Accordingly, the second optical element OE2 is rotated in a case in which the rotating ring 126 is rotated.

The rotating ring-biasing spring 127 is an example of a biasing member. The lens barrel LB is provided with a pair of rotating ring-biasing springs 127. As shown in FIG. 13, spring receiving portions 136 receiving the rotating ring-biasing springs 127 are provided at two portions in the lens barrel LB. The two spring receiving portions 136 are formed of arc-shaped grooves that have a center on the optical axis OL, and are disposed so as to be point symmetrical with respect to the optical axis OL.

—Rotating Ring-Biasing Spring—

One end of each of the rotating ring-biasing springs 127 is supported by a fixed end-support portion 138 as a fixed end, and the other end thereof is supported by a free end-support portion 140 as a free end. The spring receiving portions 136 are provided with the fixed end-support portions 138 and the rotating ring 126 is provided with the free end-support portions 140. Accordingly, the rotating ring 126 is biased in the circumferential direction by the rotating ring-biasing springs 127. A direction in which the rotating ring-biasing springs 127 bias the rotating ring 126 is a direction in which the second optical element OE2 is rotated toward the first position from the second position.

The connecting pin 134 comes into contact with one end portion of the slit 132 at a constant position, so that the rotation of the rotating ring 126, which is biased by the rotating ring-biasing springs 127, is restricted. That is, the connecting pin 134 and the slit 132 also function as rotation restricting means.

Here, the connecting pin 134 is set to be in contact with one end portion of the slit 132 in a case in which the second optical element OE2 is positioned at the first position with respect to the first optical element OE1. Accordingly, the second optical element OE2 is positioned at the first position with respect to the first optical element OE1 in a natural state.

—Pressing Pin—

Each pressing pin 128 is an example of a pressing member. As shown in FIG. 10, each pressing pin 128 has the shape of a rod and the lens adapter LA is provided with three pressing pins 128. The three pressing pins 128 are arranged at regular intervals on the same circumference around the optical axis OL of the lens device L that is to be mounted on the female lens mount 50. Further, each pressing pin 128 is disposed in parallel to the optical axis OL of the lens device L that is to be mounted on the female lens mount 50. Furthermore, the distal end of each pressing pin 128 is formed in a hemispherical shape.

The pressing pins 128 are pressed against tapered surfaces 142 of the rotating ring 126 and rotate the rotating ring 126.

—Tapered Surface—

Figure 14:
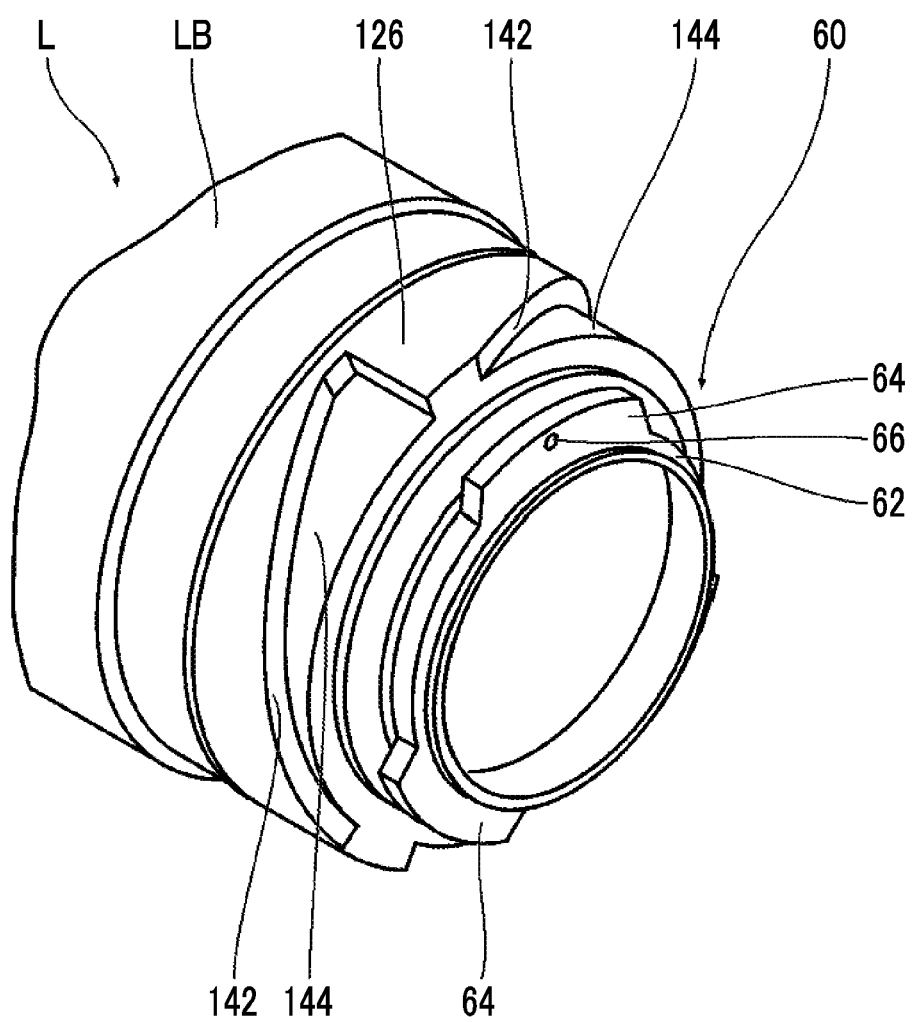
FIG. 14 is a perspective view of the rear end portion of the lens device including a rotating ring.

FIG. 14 is a perspective view of the rear end portion of the lens device including the rotating ring. Further, FIG. 15 is a development view of the outer peripheral surface of the rotating ring.

Figure 15:
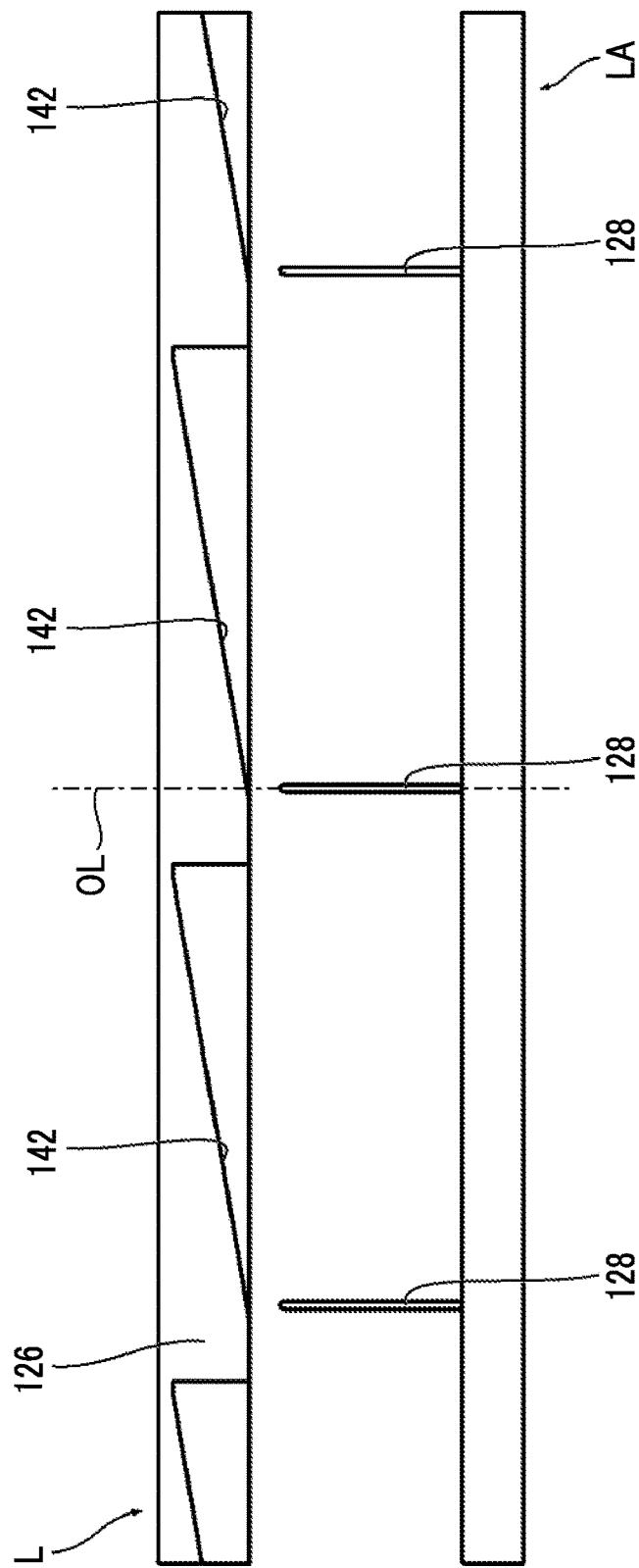
FIG. 15 is a development view of the outer peripheral surface of the rotating ring.

As shown in FIGS. 14 and 15, the rotating ring 126 includes grooves 144 that are provided at three portions on the outer peripheral surface thereof. The three grooves 144 are formed at regular intervals in the circumferential direction. In a case in which a direction along the optical axis OL is referred to as a depth direction, the bottom of each groove 144 in the depth direction is formed of the tapered surface 142. The tapered surface 142 is formed of a surface that is inclined in the direction of the optical axis OL toward the distal end from the rear end of the lens device L.

—Positional Relationship Between Tapered Surface and Pressing Pin—

As described above, the three pressing pins 128 are arranged at regular intervals on the same circumference. The diameter of a circle along which the three pressing pins 128 are arranged is set to be the same as the diameter of a circle along which the three tapered surfaces 142 are arranged. That is, the pressing pins 128 and the tapered surfaces 142 are arranged on the same circumference. As a result, in a case in which the lens device L is mounted on the lens adapter LA, the distal ends of the pressing pins 128 are in contact with the tapered surfaces 142.

As described above, each tapered surface 142 is formed of the surface that is inclined in the direction of the optical axis OL toward the distal end from the rear end of the lens device L. Here, an end portion of each tapered surface 142, which is positioned on the rear end side of the lens device L, serves as the starting point of the tapered surface 142, and an end portion of each tapered surface 142, which is positioned on the distal end side of the lens device L, serves as the end point of the tapered surface 142. The position of the end point is a position that is rotated from the starting point by an angle of 90°.

Each of the pressing pins 128 is positioned at the same position as the position of the starting point of each tapered surface 142 in a case in which the second optical element OE2 is positioned at the first position with respect to the first optical element OE1. Accordingly, the distal end of each pressing pin 128 comes into contact with the starting point of the tapered surface 142 first in a case in which the lens device L is mounted on the lens adapter LA.

—Rotating Action of Rotating Ring Obtained from Pressing Pins—

FIGS. 16A, 16B, and 16C are diagrams illustrating the rotating action of the rotating ring that is obtained from the pressing pins.

As shown in FIG. 16A, the distal end of each pressing pin 128 comes into contact with the starting point of the tapered surface 142 first in a case in which the lens device L is mounted on the lens adapter LA.

In a case in which the lens device L is pushed toward the lens adapter LA in parallel to the optical axis OL, the pressing pins 128 press the tapered surfaces 142. As a result, the rotating ring 126 is rotated by the action of the inclined tapered surfaces 142 as shown in FIG. 16B. The rotational direction of the rotating ring 126 is a direction in which the second optical element OE2 is rotated toward the second position from the first position.

In a case in which the mount base 62 of the lens device L is seated on the lens seat 52 of the lens adapter LA, the push of the tapered surfaces 142 performed by the pressing pins 128 is also stopped. At this time, each pressing pin 128 is positioned at the end point of the tapered surface 142 as shown in FIG. 16C. Since the end point of the tapered surface 142 is present at a position that is rotated from the starting point by an angle of 90°, the rotating ring 126 is rotated by an angle of 90° in a case in which each pressing pin 128 is positioned at the end point of the tapered surface 142. As a result, the second optical element OE2 is rotated from the first position by an angle of 90°. The position to which the second optical element OE2 is rotated from the first position by an angle of 90° is the second position.

In a case in which the lens device L is mounted on the lens adapter LA in this way, the rotating ring 126 is rotated by the action of the pressing pins 128 for pressing the tapered surfaces 142 and the second optical element OE2 is positioned at the second position from the first position.

Since the rotating ring 126 is biased by the rotating ring-biasing springs 127, the rotating ring 126 returns to the original position in a case in which the lens device L is detached from the lens adapter LA. That is, the rotating ring 126 is rotated in a reverse direction by an angle of 90°. As a result, the second optical element OE2 returns to the first position.

In this way, the rotating ring 126 is rotated in conjunction with the mounting/detachment of the lens device L on/from the lens adapter LA and the second optical element OE2 is rotated.

<<Action of Camera System>>

As shown in FIG. 1, the lens device L can be used in the 3-CCD type first camera device C1 and the single-CCD type second camera device C2.

<Use of Lens Device in First Camera Device>

In a case in which the lens device L is to be used in the first camera device C1, the lens device L is used in a state in which the lens device L is directly mounted on the first camera device C1.

Figure 17:
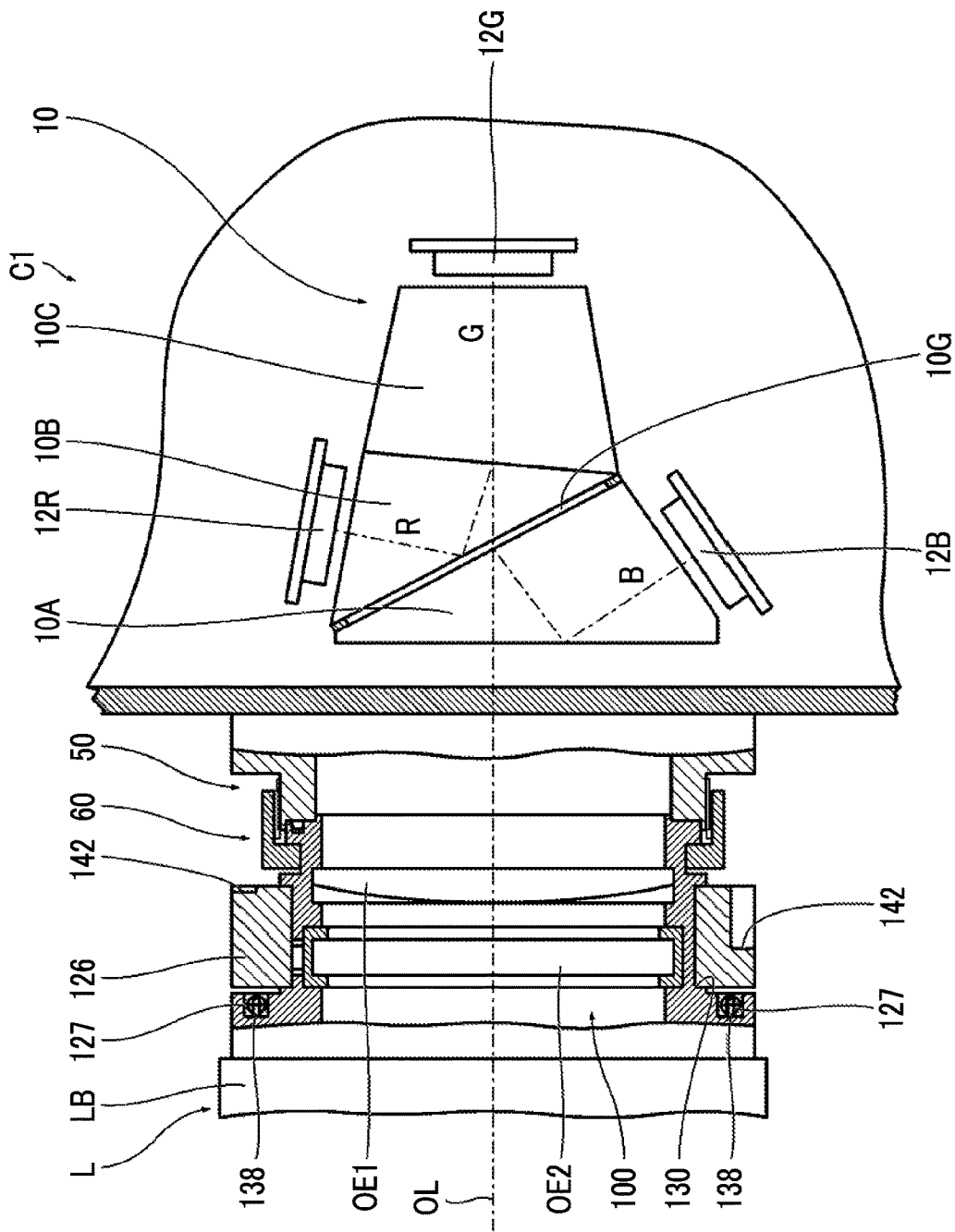
FIG. 17 is a cross-sectional view of main portions of the first camera device on which the lens device is mounted.

FIG. 17 is a cross-sectional view of main portions of the first camera device on which the lens device is mounted.

Since the first camera device C1 is not provided with pressing pins as shown in FIG. 17, the rotating ring 126 is not rotated even though the lens device L is mounted on the first camera device C1. Accordingly, the second optical element OE2 is positioned at the first position with respect to the first optical element OE1, and the aberration correction unit 100 is set to the first mode.

As described above, in the first mode, an aberration, which is generated from a synthesis of the first aberration generated by the first optical element OE1 and the second aberration generated by the second optical element OE2, is generated on light passing through the lens device L. This aberration is an aberration that can cancel an aberration caused by the color separation prism.

Accordingly, since an aberration caused by the color separation prism is cancelled by an aberration generated by the aberration correction unit 100 in a case in which the lens device L is mounted on the first camera device C1, a video without an aberration can be taken by the first camera device C1.

<Use of Lens Device in Second Camera Device>

In a case in which the lens device L is to be used in the single-CCD type second camera device C2, the lens device L is mounted on the second camera device C2 through the lens adapter LA.

Figure 18:
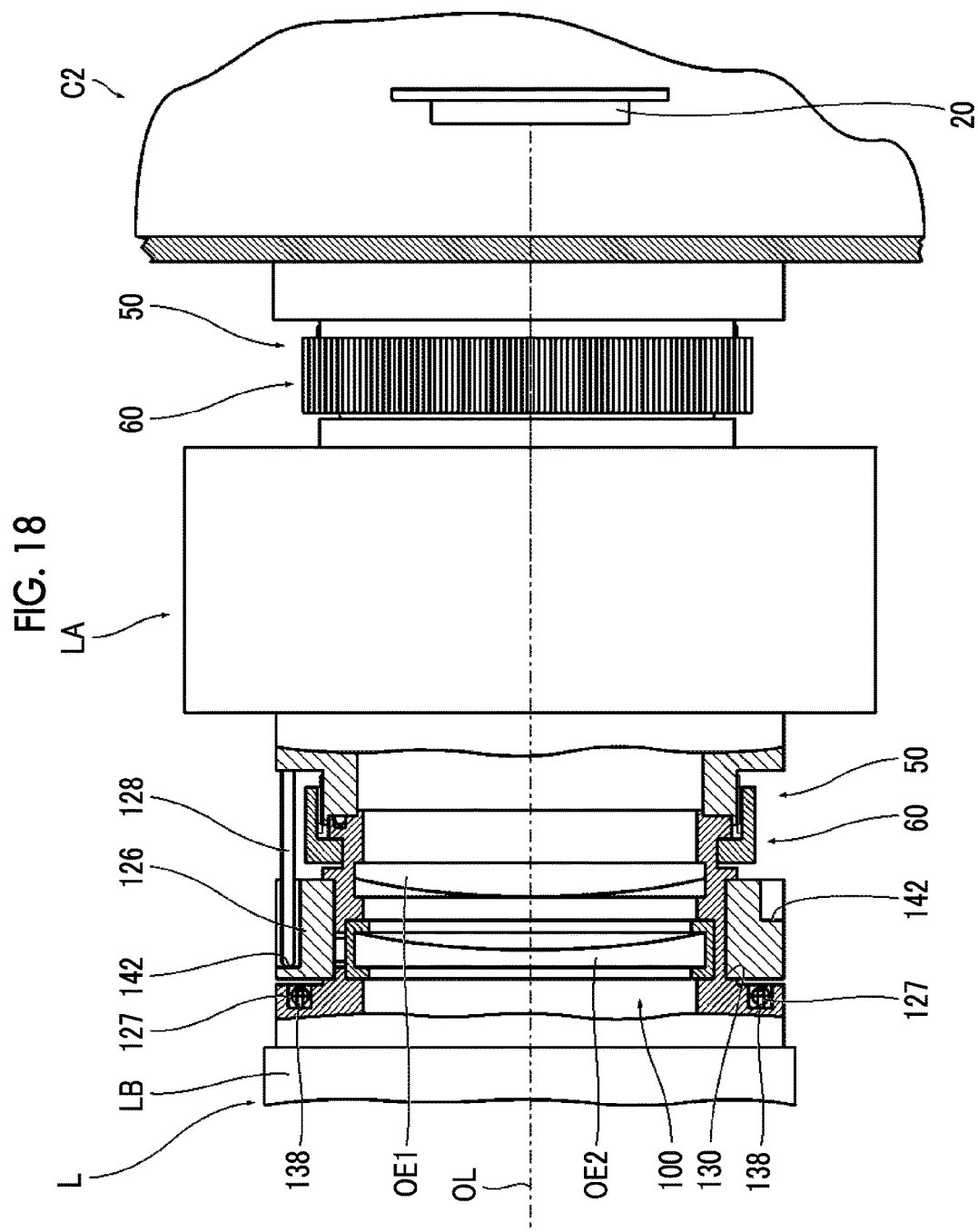
FIG. 18 is a cross-sectional view of main portions of the second camera device on which the lens device is mounted through the lens adapter.

FIG. 18 is a cross-sectional view of main portions of the second camera device on which the lens device is mounted through the lens adapter.

As shown in FIG. 18, the lens adapter LA is provided with the pressing pins 128. In a case in which the lens adapter LA is mounted on the lens device L, the pressing pins 128 press the tapered surfaces 142 of the rotating ring 126 by the action of the mounting of the lens adapter LA and rotate the rotating ring 126 against the biasing forces of the rotating ring-biasing springs 127. As a result, the second optical element OE2 is positioned at the second position with respect to the first optical element OE1, and the aberration correction unit 100 is set to the second mode.

In a case in which the aberration correction unit 100 is set to the second mode, the aberration correction unit 100 cancels the first aberration, which is generated by the first optical element OE1, by the second aberration generated by the second optical element OE2.

Accordingly, even though the lens device is used in the second camera device C2 not including the color separation prism, a video without an aberration can be taken.

According to the camera system 1 of this embodiment, as described above, the lens device L can arbitrarily generate and remove an aberration that can cancel an aberration caused by the color separation prism. Accordingly, even though the lens device L is used in any one camera device of the 3-CCD type camera device and the single-CCD type camera device, a video without an aberration can be taken.

Further, since the generation and removal of an aberration for cancellation are automatically switched according to a device on which the lens device L is to be mounted, a video without an aberration can be reliably taken.

MODIFICATION EXAMPLE

Modification Example 1 of Rotational Drive Unit

In the embodiment, the second optical element OE2 has been adapted to be automatically rotated according to a device on which the lens device L is to be mounted. However, the second optical element OE2 may be adapted to be manually rotated.

Figure 19:
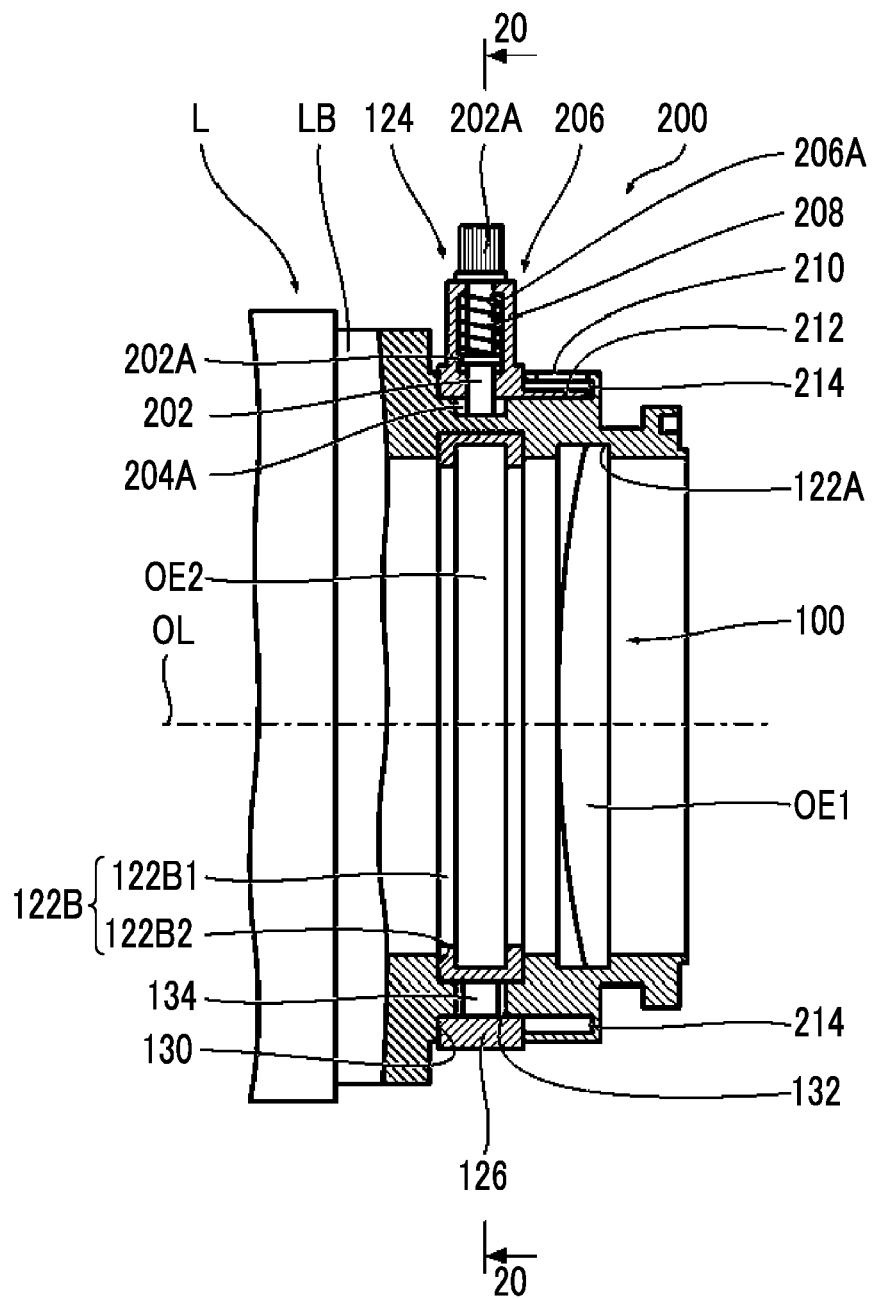
FIG. 19 is a cross-sectional view showing the structure of a rotational drive unit in a case in which a second optical element is to be manually rotated.
Figure 20:
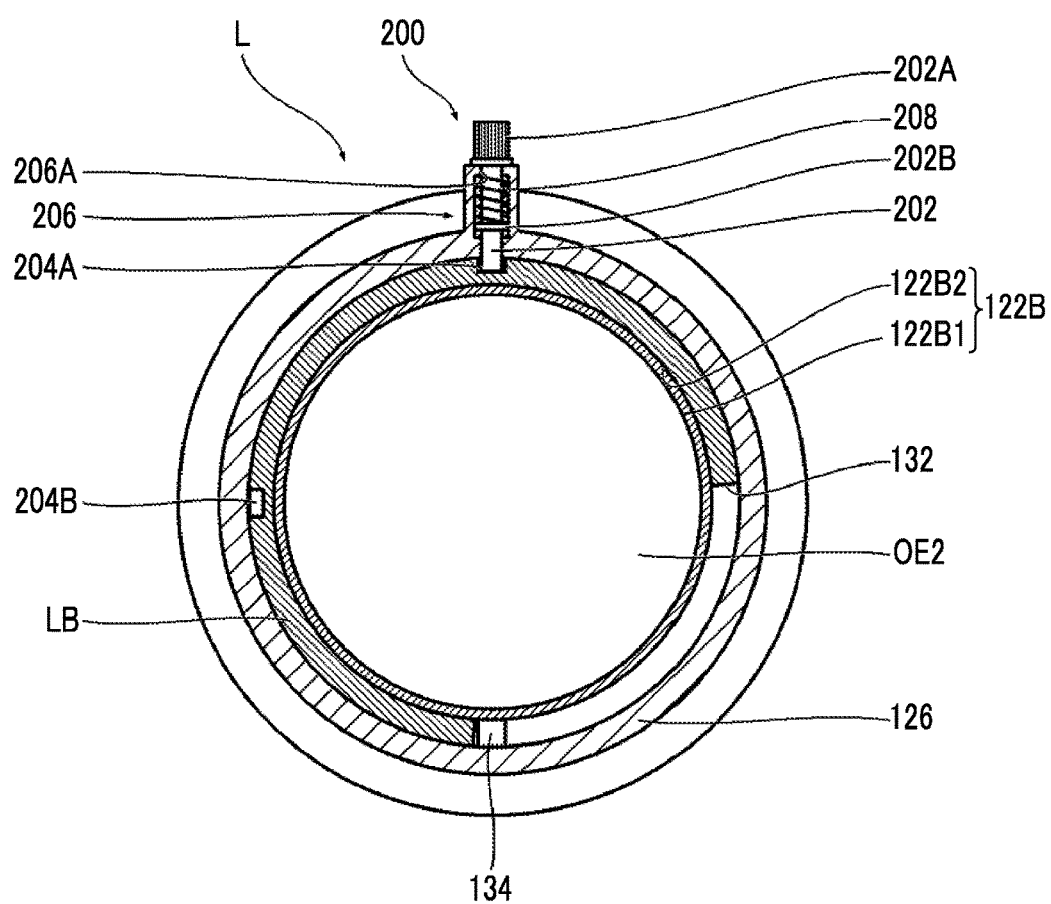
FIG. 20 is a cross-sectional view taken along line 20-20 of FIG. 19.

FIG. 19 is a cross-sectional view showing the structure of a rotational drive unit in a case in which the second optical element is to be manually rotated. Further, FIG. 20 is a cross-sectional view taken along line 20-20 of FIG. 19.

Modification example 1 is the same as the embodiment in that the second optical element OE2 is connected to the rotating ring 126 and the second optical element OE2 is rotated about the optical axis OL in a case in which the rotating ring 126 is rotated.

The rotational drive unit of this example is provided with a locking mechanism 200 that selectively locks the second optical element OE2 at the first position and the second position.

The locking mechanism 200 mainly includes a locking pin 202, a first locking groove 204A, and a second locking groove 204B.

The rotating ring 126 is provided with the locking pin 202. The rotating ring 126 is provided with a locking pin-support portion 206 that supports the locking pin 202.

The locking pin-support portion 206 has the shape of a hollow cylinder, and includes a locking pin-support hole 206A that is formed at the center thereof. The locking pin-support hole 206A is formed so as to pass through the rotating ring 126 in a radial direction. The locking pin 202 is inserted into the locking pin-support hole 206A, and is supported so as to be movable forward and backward in the radial direction of the rotating ring 126.

The locking pin 202 includes a knob portion 202A that is provided at an end portion thereof. The knob portion 202A is disposed so as to protrude from the locking pin-support portion 206.

Further, the locking pin 202 includes a flange portion 202B that is provided on the middle portion of the locking pin 202 in the axial direction. The flange portion 202B is received in the locking pin-support portion 206.

A locking pin-biasing spring 208, which is an example of a locking pin-biasing member, is received in the locking pin-support portion 206. The locking pin-biasing spring 208 is in contact with the flange portion 202B of the locking pin 202, and biases the locking pin 202 in a direction toward the radial inside of the rotating ring 126, that is, the center of the second optical element OE2.

Each of the first and second locking grooves 204A and 204B is provided on the bottom portion of the second optical element-holding groove 122B2 as a recess to which the distal end of the locking pin 202 can be fitted. The first locking groove 204A is provided at a position where the locking pin 202 is disposed in a case in which the second optical element OE2 is positioned at the first position with respect to the first optical element OE1. On the other hand, the second locking groove 204B is provided at a position where the locking pin 202 is disposed in a case in which the second optical element OE2 is positioned at the second position with respect to the first optical element OE1. Accordingly, the locking pin 202 can be fitted to the first locking groove 204A in a case in which the second optical element OE2 is positioned at the first position with respect to the first optical element OE1, and the locking pin 202 can be fitted to the second locking groove 204B in a case in which the second optical element OE2 is positioned at the second position with respect to the first optical element OE1.

The lens device L of this example is provided with the following setting mode confirmation mechanism for a structure for manually switching the setting mode of the aberration correction unit 100.

Figure 21A:
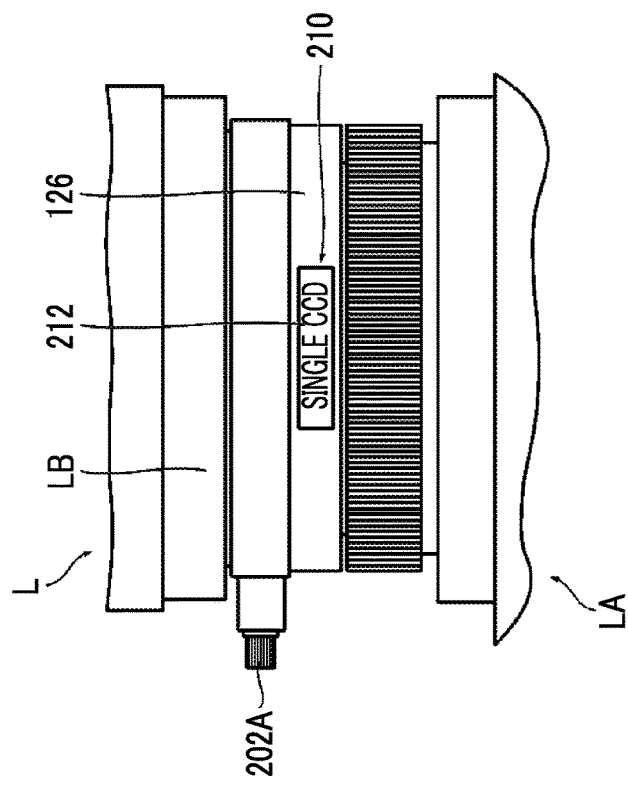
FIGS. 21A and 21B are plan views showing the structure of a mode confirmation mechanism.
Figure 21B:
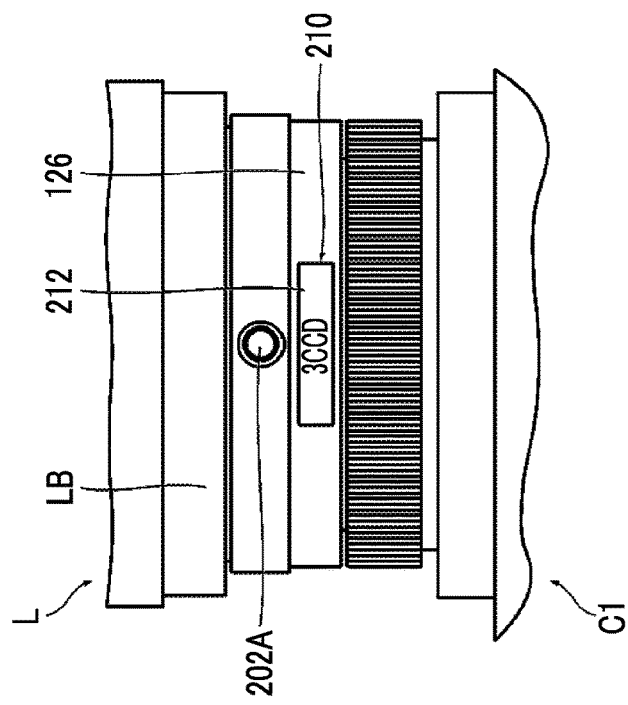

FIGS. 21A and 21B are plan views showing the structure of the mode confirmation mechanism. FIG. 21A shows a state in which the aberration correction unit 100 is set to the first mode, and FIG. 21B shows a state in which the aberration correction unit 100 is set to the second mode.

As shown in FIGS. 21A and 21B, the optical element-holding part 122 of the lens barrel LB is provided with a mode confirmation window 210. As shown in FIG. 19, the rotating ring 126 is provided with a mode display plate 212. The mode display plate 212 is formed of an arc-shaped plate. The mode display plate 212 is received in an annular mode display plate-receiving groove 214 that is provided at the lens barrel LB. The mode display plate 212 is rotated in conjunction with the rotating ring 126. In this case, the mode display plate 212 is rotated while sliding in the mode display plate-receiving groove 214.

The mode display plate 212 displays an indication that the aberration correction unit 100 is set to the first mode and an indication that the aberration correction unit 100 is set to the second mode. The indication that the aberration correction unit 100 is set to the first mode is a character of "3CCD" as shown in FIG. 21A. The indication that the aberration correction unit 100 is set to the second mode is a character of "SINGLE CCD" as shown in FIG. 21B.

In a case in which the second optical element OE2 is positioned at the first position with respect to the first optical element OE1 and the aberration correction unit 100 is set to the first mode, the indication of "3CCD" is shown up in the mode confirmation window 210 as shown in FIG. 21A. On the other hand, in a case in which the second optical element OE2 is positioned at the second position with respect to the first optical element OE1 and the aberration correction unit 100 is set to the second mode, the indication of "SINGLE CCD" is shown up in the mode confirmation window 210 as shown in FIG. 21B. A user can confirm the current setting of the aberration correction unit 100 by confirming the indication of the mode confirmation window 210.

FIGS. 22A and 22B are diagrams illustrating the action of a modification example of the rotational drive unit. FIG. 22A shows a state in which the rotating ring is being rotated, and FIG. 22B shows a state in which the second optical element is locked at the second position.

In a case in which the mode of the aberration correction unit 100 is to be switched, the locking pin 202 is pulled out of the locking groove first. In a case in which the knob portion 202A is pulled against the biasing force of the locking pin-biasing spring 208, the locking pin 202 can be pulled out of the locking groove. Accordingly, the locking of the rotating ring 126 is released as shown in FIG. 22A and the rotating ring 126 can be freely rotated.

For example, in a case in which the aberration correction unit 100 is to be set to the second mode, the rotating ring 126 is rotated in a direction in which the second optical element OE2 is moved to the second position. In a case in which the rotating ring 126 is rotated and the second optical element OE2 is positioned at the second position, the locking pin 202 is moved to the position of the second locking groove 204B as shown in FIG. 22B. Since the locking pin 202 is biased by the locking pin-biasing spring 208, the locking pin 202 is automatically fitted to the second locking groove 204B in a case in which the locking pin 202 is moved to the position of the second locking groove 204B. Accordingly, the rotating ring 126 is locked.

According to the rotational drive unit of this example, as described above, the rotating ring 126 can be manually rotated and can be locked at a desired position. Further, according to the lens device of this example, the set mode can also be easily confirmed since the mode confirmation mechanism is provided.

Modification Example 2 of Rotational Drive Unit

The second optical element OE2 can also be adapted to be rotated by an actuator, such as a motor.

FIG. 23 is a cross-sectional view showing the structure of the rotational drive unit in a case in which the second optical element is rotated by a motor. Further, FIG. 24 is a cross-sectional view taken along line 24-24 of FIG. 23.

Figure 24:
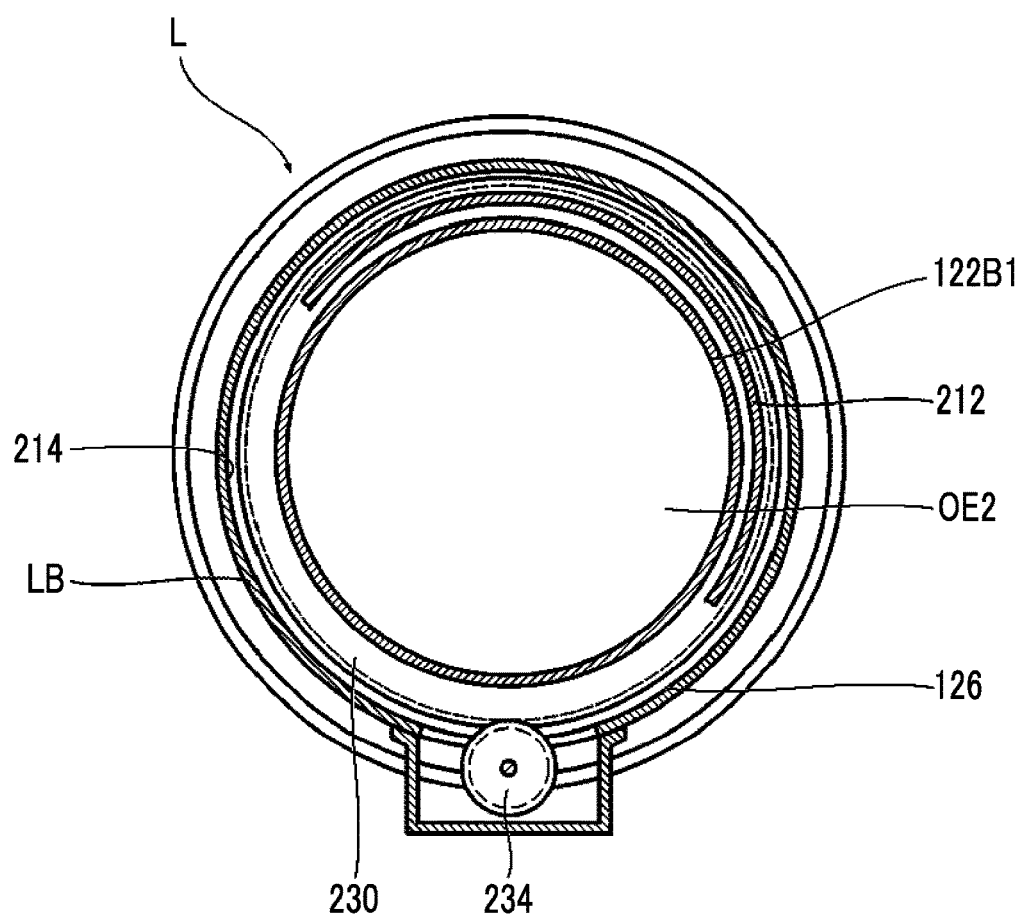
FIG. 24 is a cross-sectional view taken along line 24-24 of FIG. 23.

As shown in FIGS. 23 and 24, a gear portion 230 is provided on the outer peripheral portion of the second optical element-holding frame 122B1.

As shown in FIG. 23, the lens barrel LB is provided with a second optical element-rotational drive motor 232. The output shaft of the second optical element-rotational drive motor 232 is provided with a driving gear 234. The driving gear 234 meshes with the gear portion 230.

In a case in which the second optical element-rotational drive motor 232 is driven, the driving gear 234 is rotated and the rotation of the driving gear 234 is transmitted to the gear portion 230. As a result, the second optical element-holding frame 122B1 is rotated. Accordingly, the second optical element OE2 is rotated about the optical axis OL.

The driving of the second optical element-rotational drive motor 232 is controlled by a control unit 236. The control unit 236 controls the driving of the second optical element-rotational drive motor 232 on the basis of information input from an input unit 238 and rotates the second optical element OE2 to the first position and the second position.

For example, the input unit 238 is formed of a switch that can be instructed to be turned on/off. An aberration for cancellation is instructed to be generated in a case in which the switch is turned on, and is instructed to be removed in a case in which the switch is turned off. In a case in which ON-information is input from the input unit 238, the control unit 236 drives the second optical element-rotational drive motor 232 so that the second optical element OE2 is positioned at the first position. Further, in a case in which OFF-information is input from the input unit 238, the control unit 236 drives the second optical element-rotational drive motor 232 so that the second optical element OE2 is positioned at the second position.

The switch is adapted to be manually turned on/off, but may also be adapted to be automatically turned on/off in conjunction with the mounting of the camera device.

The aspect of the control of the second optical element-rotational drive motor 232 is not limited thereto. Alternatively, for example, the control unit 236 may acquire information on the camera device on which the lens device is mounted to control the driving of the second optical element-rotational drive motor 232. That is, the control unit 236 acquires information on whether a camera device on which the lens device is mounted is a 3-CCD type camera device or a single-CCD type camera device from the camera device to control the driving of the second optical element-rotational drive motor 232.

The control unit 236 acquires information on whether a camera device on which the lens device is mounted is a 3-CCD type camera device or a single-CCD type camera device by, for example, communication with the camera device. Alternatively, the control unit 236 is provided with a detector for detecting the type of the camera device and acquires information on whether a camera device on which the lens device is mounted is a 3-CCD type camera device or a single-CCD type camera device from the detector.

Other Modification Examples

In the embodiment, the first optical element OE1 has been adapted to be fixed and the second optical element OE2 has been adapted to be rotated. However, the second optical element OE2 may be adapted to be fixed and the first optical element OE1 may be adapted to be rotated to generate and remove an aberration for cancellation. Alternatively, both the first and second optical elements OE1 and OE2 are rotatably supported, and may be adapted to be rotated to generate and remove an aberration for cancellation.

Further, in the camera system of the embodiment, the lens device L has been adapted to be mounted on the second camera device C2 through the lens adapter LA in a case in which the lens device is used in the second camera device C2. However, in a case in which the sensor size and flange back length of the second camera device C2 are the same as those of the first camera device C1, the lens device can be used in a state in which the lens device is directly mounted on the second camera device C2. In this case, in a case in which a mechanism using the pressing pins 128 and the tapered surfaces 142 is employed as the rotational drive unit, the second camera device C2 is provided with the pressing pins 128.

Further, in a case in which the first and second camera devices are different from each other in terms of only a flange back length, a lens adapter can be mounted to adjust a flange back length. In this case, a lens adapter not including an optical member or a lens adapter including a transparent glass plate is used.

The lens device has been formed of a rear focus type zoom lens device in the embodiment, but the structure of the lens device is not limited thereto. Further, the lens device may be provided with a vibration-proof mechanism and the like.

EXPLANATION OF REFERENCES

1: camera system
10: color separation prism
10A: first prism
10A1: imaging light-incident surface
10A2: B-reflective surface
10A3: B-emitting surface
10B: second prism
10B1: RG-incident surface
10B2: R-reflective surface
10B3: R-emitting surface
10C: third prism
10C1: G-incident surface
10C2: G-emitting surface
10G: air gap
12B: image sensor
12B1: light-receiving surface
12G: image sensor
12G1: light-receiving surface
12R: image sensor
12R1: light-receiving surface
14: spacer
20: image sensor
22: light-receiving surface
50: female lens mount
52: lens seat
52A: male screw portion
54: mount ring
54A: female screw portion
54B: lens fixing portion
54C: notch
56: positioning pin
60: male lens mount
62: mount base
64: bayonet claw
66: positioning hole
100: aberration correction unit
122: optical element-holding part
122A: first optical element-holding portion
122B: second optical element-holding portion
122B1: second optical element-holding frame
122B2: second optical element-holding groove
124: rotational drive unit
126: rotating ring
127: rotating ring-biasing spring
128: pressing pin 130: rotating ring-holding groove
132: slit
134: connecting pin
136: spring receiving portion
138: fixed end-support portion
140: free end-support portion
142: tapered surface
144: groove
200: locking mechanism
202: locking pin
202A: knob portion
202B: flange portion
204A: first locking groove
204B: second locking groove
206: locking pin-support portion
206A: locking pin-support hole
208: locking pin-biasing spring
210: mode confirmation window
212: mode display plate
214: mode display plate-receiving groove
230: gear portion
232: second optical element-rotational drive motor
234: driving gear
236: control unit
238: input unit
C1: first camera device
C2: second camera device
L: lens device
L1: first lens group
L2: second lens group
L3: third lens group
L4: fourth lens group
LA: lens adapter
LB: lens barrel
MF: body frame
OE1: first optical element
OE2: second optical element
OL: optical axis
S: diaphragm
S1: cross-section
S2: cross-section

What is claimed is:

1. A lens device that is detachably mounted on a 3-CCD type first camera device including a color separation prism and a single-CCD type second camera device, the lens device comprising:
an aberration correction unit that corrects an aberration caused by the color separation prism in a case in which the lens device is mounted on the first camera device,
wherein the aberration correction unit includes a first optical element that is disposed on an optical axis of the lens device and generates a first aberration on light having passed through the lens device, a second optical element that is disposed on the optical axis of the lens device and generates a second aberration on the light having passed through the lens device, and an optical element-holding part that holds the first and second optical elements so as to allow the first and second optical elements to be rotatable relative to each other about the optical axis of the lens device,
an aberration, which is capable of canceling an aberration caused by the color separation prism, is generated from a synthesis of the first aberration generated by the first optical element and the second aberration generated by the second optical element in a case in which the second optical element is positioned at a first position with respect to the first optical element, and
the first aberration generated by the first optical element is cancelled by the second aberration generated by the second optical element in a case in which the second optical element is positioned at a second position with respect to the first optical element.

2. The lens device according to claim 1,
wherein the aberration correction unit corrects an aberration that is generated in a case in which the light having passed through the lens device passes through an air gap of the color separation prism.

3. The lens device according to claim 1,
wherein the optical element-holding part fixedly holds the first optical element and holds the second optical element so as to allow the second optical element to be rotatable.

4. The lens device according to claim 1,
wherein the aberration correction unit further includes a rotational drive unit that rotates the second optical element to the first position with respect to the first optical element in a case in which the lens device is mounted on the first camera device and rotates the second optical element to the second position with respect to the first optical element in a case in which the lens device is mounted on the second camera device.

5. The lens device according to claim 4,
wherein the rotational drive unit includes
a biasing member that biases the second optical element in a direction in which the second optical element is rotated toward the first position from the second position,
a driven member that is provided on the second optical element and includes a tapered surface inclined in a direction of the optical axis of the lens device, and
a pressing member that is provided on the second camera device and comes into contact with the tapered surface to press the tapered surface along the optical axis of the lens device and rotate the second optical element to the second position against a biasing force of the biasing member in a case in which the lens device is mounted on the second camera device.

6. The lens device according to claim 5,
wherein the lens device is mounted on the second camera device through a lens adapter, and
the lens adapter is provided with the pressing member.

7. The lens device according to claim 3,
wherein the aberration correction unit further includes a locking mechanism that selectively locks the second optical element at the first position and the second position, and
the locking mechanism includes a locking pin that is provided so as to be movable forward and backward in a radial direction of the second optical element, a locking pin-biasing member that biases the locking pin in a direction toward the center of the second optical element, a first locking groove which is provided on the optical element-holding part and to which the locking pin is fitted in a case in which the second optical element is positioned at the first position, and a second locking groove which is provided on the optical element-holding part and to which the locking pin is fitted in a case in which the second optical element is positioned at the second position.

8. A camera system comprising:
a 3-CCD type first camera device that includes a color separation prism;
a single-CCD type second camera device; and the lens device according to claim 1.

9. An aberration correction unit that is built in a lens device detachably mounted on a 3-CCD type first camera device including a color separation prism and a single-CCD type second camera device and corrects an aberration caused by the color separation prism in a case in which the lens device is mounted on the first camera device, the aberration correction unit comprising:
- a first optical element that is disposed on an optical axis of the lens device and generates a first aberration on light having passed through the lens device;
- a second optical element that is disposed on the optical axis of the lens device and generates a second aberration on the light having passed through the lens device; and
- an optical element-holding part that holds the first and second optical elements so as to allow the first and second optical elements to be rotatable relative to each other about the optical axis of the lens device,
- wherein an aberration, which is capable of canceling an aberration caused by the color separation prism, is generated from a synthesis of the first aberration generated by the first optical element and the second aberration generated by the second optical element in a case in which the second optical element is positioned at a first position with respect to the first optical element, and
- the first aberration generated by the first optical element is cancelled by the second aberration generated by the second optical element in a case in which the second optical element is positioned at a second position with respect to the first optical element.

* * * * *